(12) United States Patent
Lee et al.

(10) Patent No.: US 6,743,142 B1
(45) Date of Patent: Jun. 1, 2004

(54) MULTI-SPEED DUAL-CLUTCH PLANETARY TRANSMISSION MECHANISMS HAVING THREE INTERCONNECTING MEMBERS

(75) Inventors: Chunhao J. Lee, Troy, MI (US); Patrick B. Usoso, Troy, MI (US)

(73) Assignee: General Motors Corporation, Detroit, MI (US)

( * ) Notice: Subject to any disclaimer, the term of this patent is extended or adjusted under 35 U.S.C. 154(b) by 1 day.

(21) Appl. No.: 10/303,679

(22) Filed: Nov. 25, 2002

(51) Int. Cl.$^7$ ................................................ F16H 3/44
(52) U.S. Cl. ...................................... 475/276; 475/303
(58) Field of Search .................................. 475/303, 276

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,385,064 A | 1/1995 | Reece | 74/331 |
| 5,497,867 A | 3/1996 | Hirsch et al. | 192/48.91 |
| 5,560,461 A | 10/1996 | Loeffler | 192/53.32 |
| 5,599,251 A | 2/1997 | Beim et al. | 475/275 |
| 5,641,045 A | 6/1997 | Ogawa et al. | 192/53.341 |
| 5,651,435 A | 7/1997 | Perosky et al. | 192/24 |
| 5,975,263 A | 11/1999 | Forsyth | 192/53.32 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,354,416 B1 | 3/2002 | Eo | 192/53.341 |
| 6,663,528 B1 * | 12/2003 | Haka | 475/303 |
| 6,663,529 B1 * | 12/2003 | Haka | 475/303 |
| 6,669,596 B1 * | 12/2003 | Sefcik | 475/278 |
| 2003/0232689 A1 * | 12/2003 | Haka | 475/303 |

FOREIGN PATENT DOCUMENTS

JP          9-126283          5/1997

* cited by examiner

*Primary Examiner*—Dirk Wright
(74) *Attorney, Agent, or Firm*—Kathryn A. Marra

(57) ABSTRACT

The family of transmissions has a plurality of members that can be utilized in powertrains to provide at least six forward speed ratios and one reverse speed ratio. The transmission family members include four planetary gear sets, two or three input clutches, seven, eight or nine torque transmitting mechanisms and three fixed interconnections. The invention provides a low content multi-speed dual clutch transmission mechanism wherein the two input clutches alternately connect the engine to realize odd and even speed ratio changes. The torque transmitting mechanisms provide connections between various gear members, the fixed interconnections, the input clutches, the output shaft, and the transmission housing, and are operated in combinations of at least three to establish at least five forward speed ratios and at least one reverse speed ratio.

39 Claims, 14 Drawing Sheets

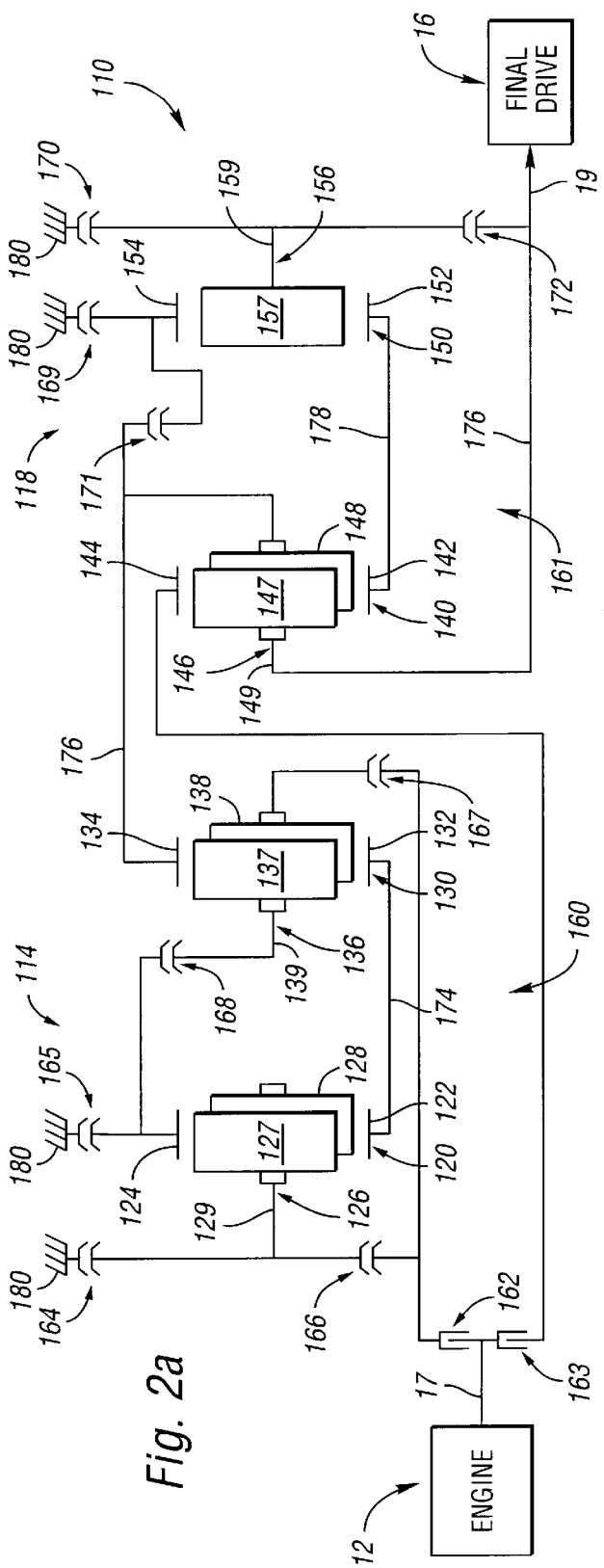

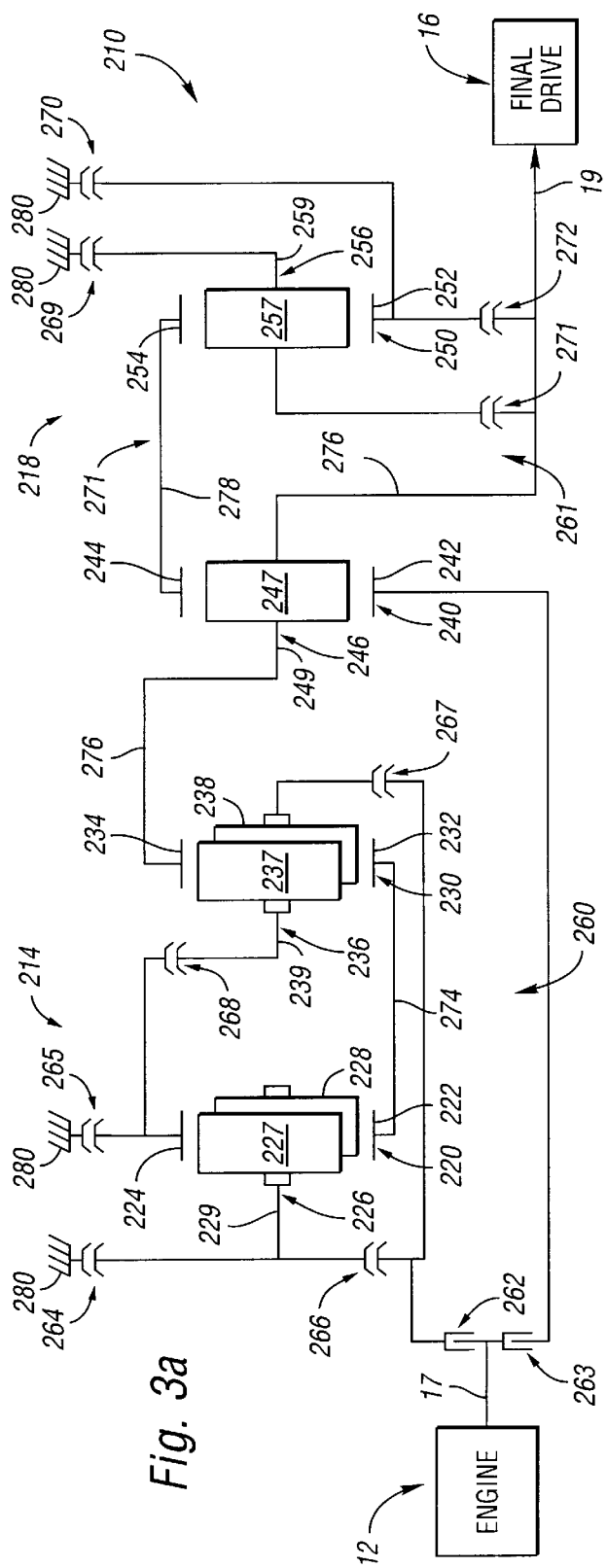

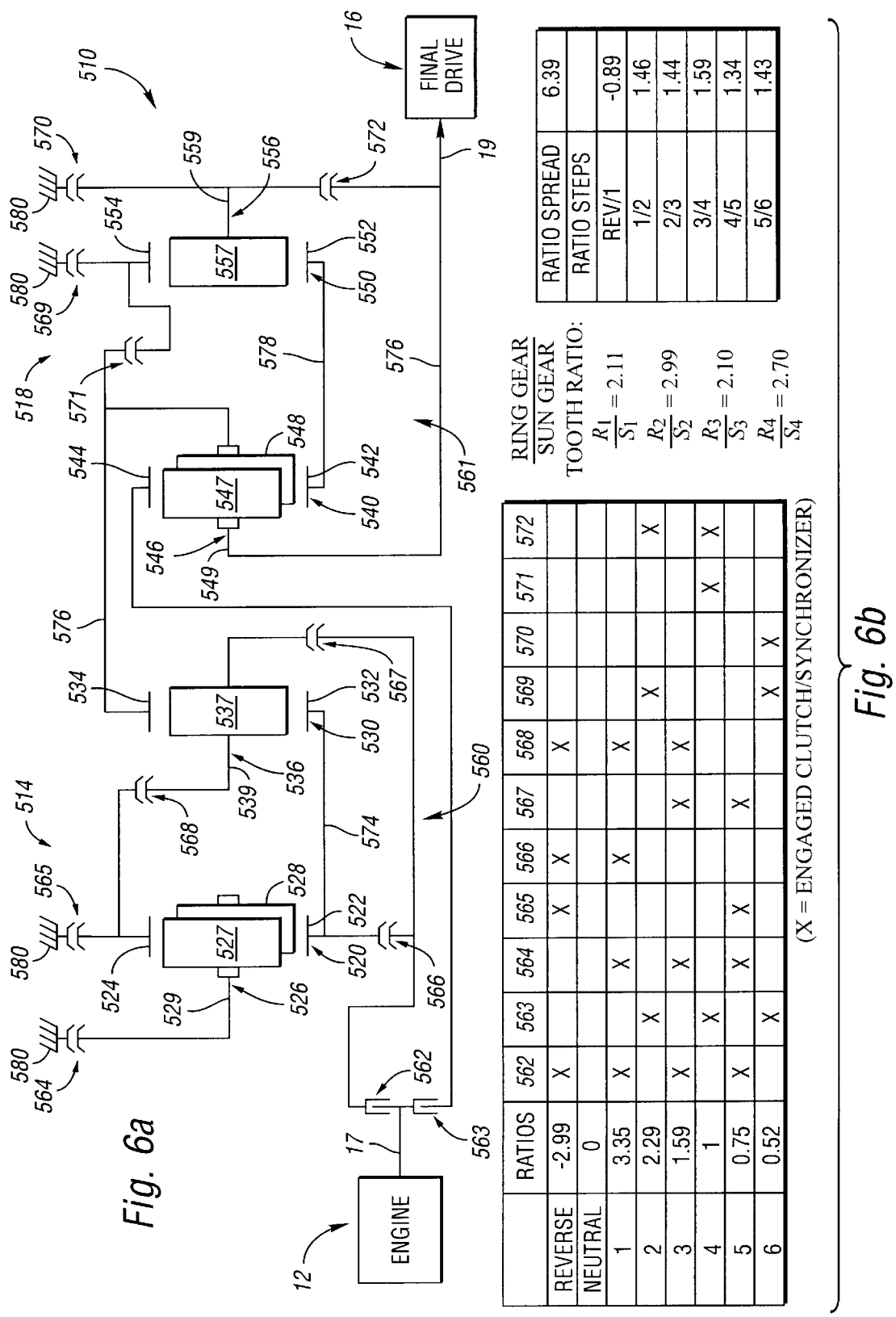

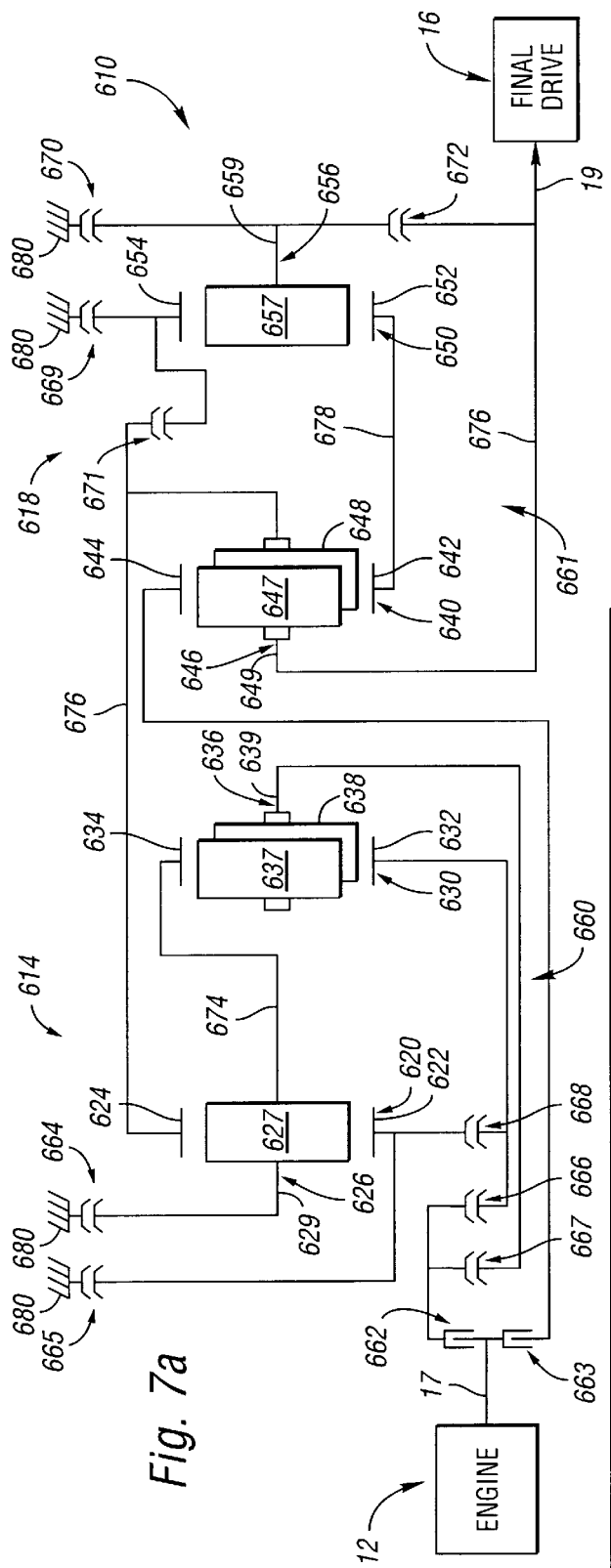

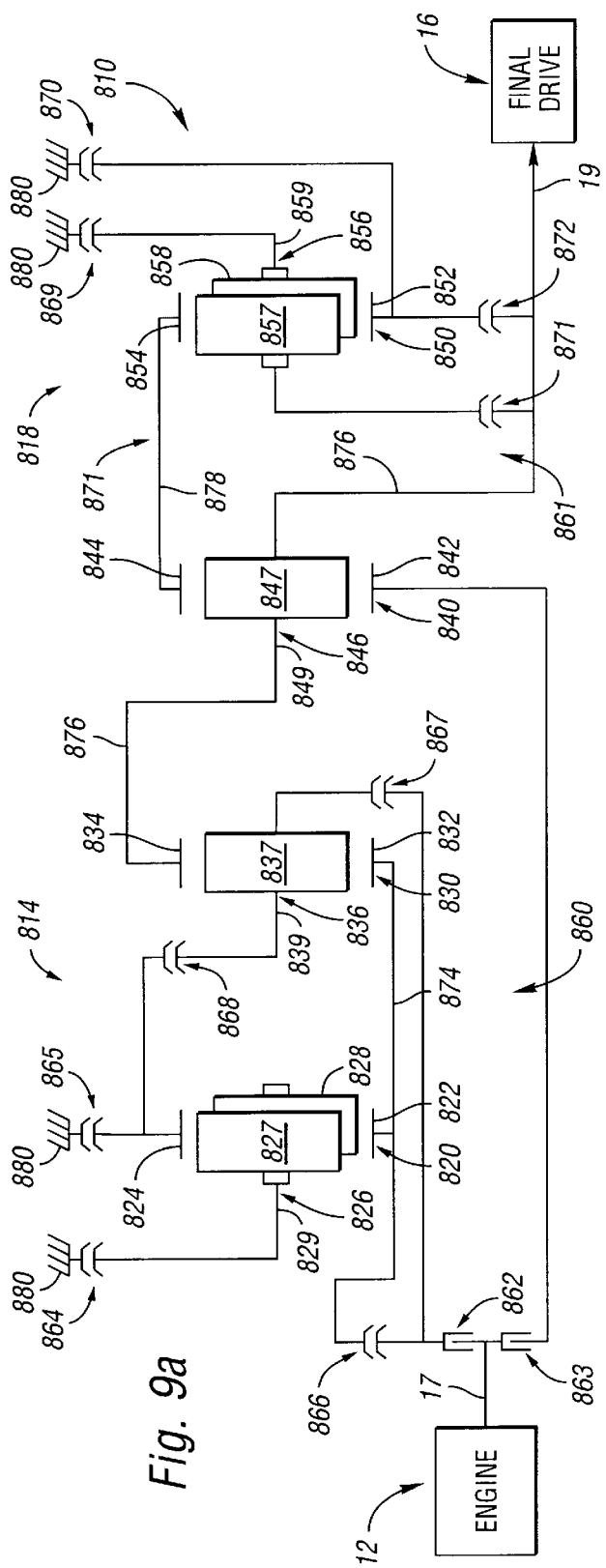

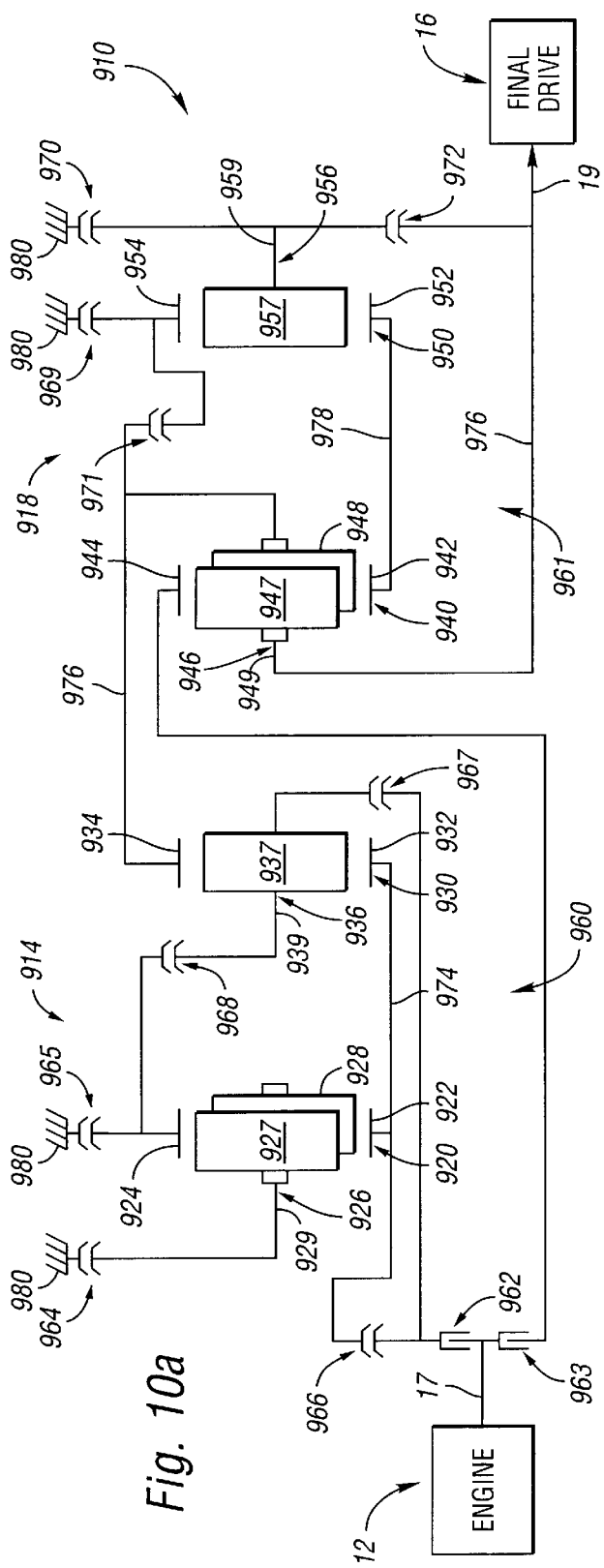

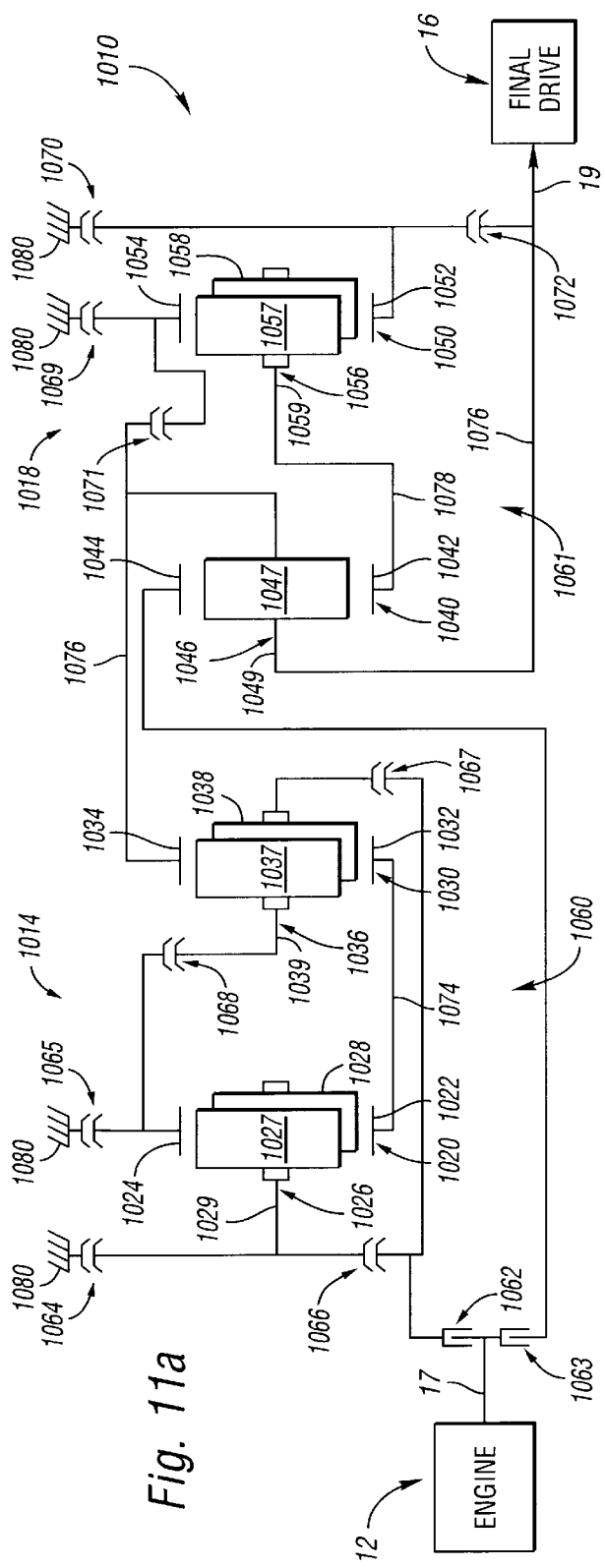

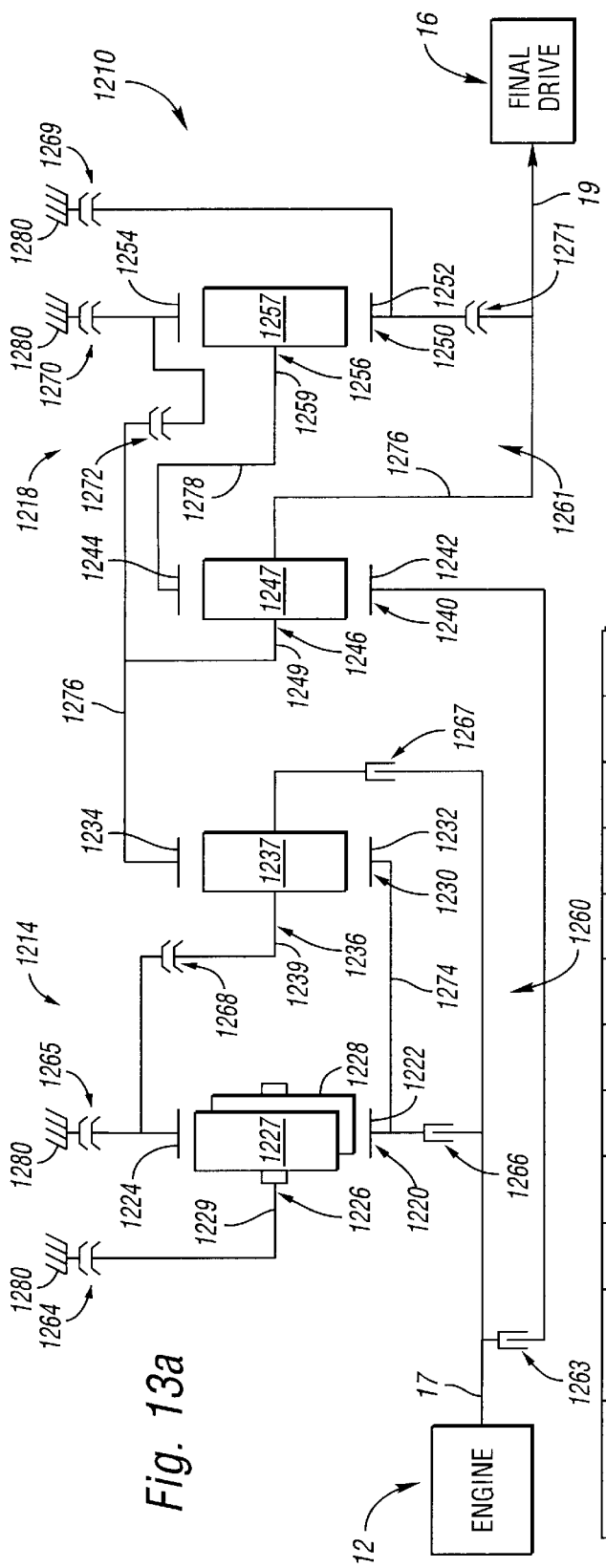

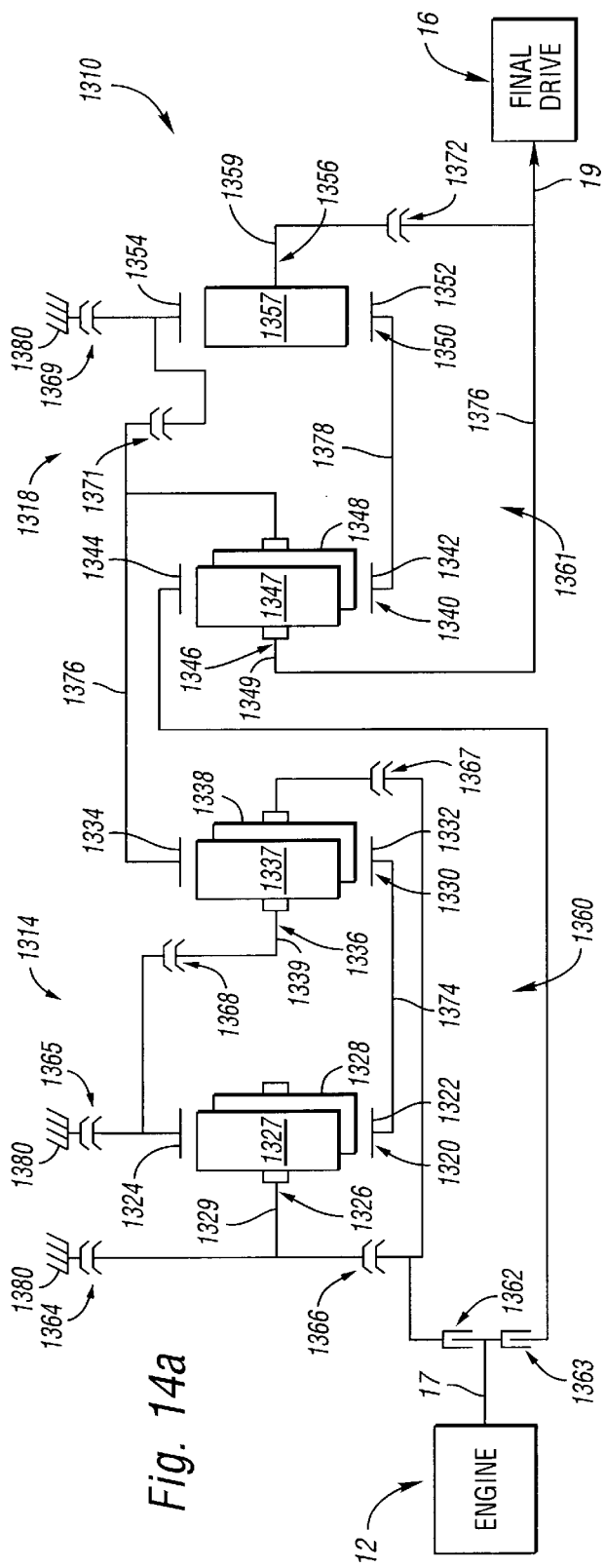

MULTI-SPEED DUAL-CLUTCH PLANETARY TRANSMISSION MECHANISMS HAVING THREE INTERCONNECTING MEMBERS

TECHNICAL FIELD

The present invention relates to a family of power transmissions having two input clutches which selectively connect an input shaft to first and second pairs of planetary gear sets to provide at least six forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times.

A primary focus of transmission and engine design work is in the area of increasing vehicle fuel efficiency. Manual transmissions typically provide improved vehicle fuel economy over automatic transmissions because automatic transmissions use a torque converter for vehicle launch and multiple plate hydraulically-applied clutches for gear engagement. Clutches of this type, left unengaged or idling, impose a parasitic drag torque on a drive line due to the viscous shearing action which exists between the plates and discs rotating at different speeds relative to one another. This drag torque adversely affects vehicle fuel economy for automatic transmissions. Also, the hydraulic pump that generates the pressure needed for operating the above-described clutches further reduces fuel efficiency associated with automatic transmissions. Manual transmissions eliminate these problems.

While manual transmissions are not subject to the above described fuel efficiency related problems, manual transmissions typically provide poor shift quality because a significant torque interruption is required during each gear shift as the engine is disengaged from the transmission by the clutch to allow shafts rotating at different speeds to be synchronized.

So called "automated manual" transmissions provide electronic shifting in a manual transmission configuration which, in certain circumstances, improves fuel efficiency by eliminating the parasitic losses associated with the torque converter and hydraulic pump needed for clutching. Like manual transmissions, a drawback of automated manual transmissions is that the shift quality is not as high as an automatic transmission because of the torque interruption during shifting.

So called "dual-clutch automatic" transmissions also eliminate the torque converter and replace hydraulic clutches with synchronizers but they go further to provide gear shift quality which is superior to the automated manual transmission and similar to the conventional automatic transmission, which makes them quite attractive. However, most known dual-clutch automatic transmissions include a lay shaft or countershaft gear arrangement, and have not been widely applied in vehicles because of their complexity, size and cost. For example, a dual clutch lay shaft transmission could require eight sets of gears, two input/shift clutches and seven synchronizers/dog clutches to provide six forward speed ratios and a reverse speed ratio. An example of a dual-clutch automatic transmission is described in U.S. Pat. No. 5,385,064, which is hereby incorporated by reference.

SUMMARY OF THE INVENTION

The invention provides a low content multi-speed dual-clutch transmission family utilizing planetary gear sets rather than lay shaft gear arrangements. In particular, the invention includes four planetary gear sets, two input/shift clutches, and nine selectable torque transmitting mechanisms to provide at least six forward speed ratios and a reverse speed ratio.

According to one aspect of the invention, the family of transmissions has four planetary gear sets, each of which includes a first, second and third member, which members may comprise a sun gear, ring gear, or a planet carrier assembly member.

In referring to the first, second, third and fourth gear sets in this description and in the claims, these sets may be counted "first" to "fourth" in any order in the drawings (i.e. left-to-right, right-to-left, etc.).

In another aspect of the present invention, each of the planetary gear sets may be of the single pinion type or of the double pinion type.

In yet another aspect of the present invention, the first member of the first planetary gear set is continuously connected with the first member of the second planetary gear set through a first interconnecting member.

In yet another aspect of the present invention, a member of the first or second planetary gear set is continuously connected with the first member of the third planetary gear set and with the output shaft through a second interconnecting member.

In yet another aspect of the present invention, the second member of the third planetary gear set is continuously connected with the first member of the fourth planetary gear set through a third interconnecting member.

In accordance with a further aspect of the invention, a first input clutch selectively connects the input shaft with members of the first or second planetary gear set, through other torque-transmitting mechanisms, such as rotating synchronizers.

In accordance with another aspect of the present invention, a second input clutch selectively connects the input shaft with the third member of the third planetary gear set.

In another aspect of the invention, first and second torque transmitting mechanisms, such as rotating synchronizers, selectively connect members of the first and second planetary gear sets with the first input clutch.

In another aspect of the invention, a third torque transmitting mechanism, such as a rotating synchronizer, selectively connects a member of the first or second planetary gear sets with another member of the first or second planetary gear set or with the first input clutch.

In still a further aspect of the invention, fourth and fifth torque transmitting mechanisms, such as rotating synchronizers, selectively connect members of the third planetary gear set with members of the fourth planetary gear set.

In still another aspect of the invention, sixth and seventh torque transmitting mechanisms, such as braking synchronizers, selectively connect members of the first or second planetary gear set with a stationary member (transmission housing).

In still another aspect of the invention, eighth and ninth torque transmitting mechanisms, such as braking synchronizers, selectively connect members of the fourth planetary gear set with the stationary member.

In accordance with a further aspect of the invention, the input clutches and torque transmitting mechanisms are selectively engaged in combinations of at least three to provide at least six forward speed ratios and a reverse speed ratio.

In accordance with a further aspect of the invention, the first input clutch is applied for odd number speed ranges, and the second input clutch is applied for even number speed ranges, or vice versa.

In another aspect of the invention, the first input clutch and the second input clutch are interchanged (i.e. alternately engaged) to shift from odd number speed range to even number speed range, or vice versa.

In accordance with a further aspect of the invention, each selected torque transmitting mechanism for a new speed ratio is engaged prior to shifting of the input clutches to achieve shifts without torque interruptions.

In accordance with a further aspect of the invention, at least one pair of synchronizers is executed as a double synchronizer to reduce cost and package size.

In accordance with a further aspect of the invention, the first input clutch can be eliminated and the first and second rotating synchronizers can be used as input clutches to further reduce content.

In accordance with a further aspect of the invention, at least one of the torque transmitting mechanisms can be eliminated to realize five forward speed ratios and a reverse speed ratio.

The above objects, features, advantages, and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention;

FIG. 11b is a truth table and chart depicting some of the operating characteristics of the powertrain shown in FIG. 11a;

FIG. 12a is a schematic representation of a powertrain having a planetary transmission incorporating another family member of the present invention;

FIG. 12b is a truth table and chart depicting some of the operating characteristics of the powertrain shown in FIG. 12a;

FIG. 13a is a schematic representation of a powertrain having a planetary transmission incorporating another family member of the present invention;

FIG. 13b is a truth table and chart depicting some of the operating characteristics of the powertrain shown in FIG. 13a;

FIG. 14a is a schematic representation of a powertrain having a planetary transmission incorporating another family member of the present invention; and FIG. 14b is a truth table and chart depicting some of the operating characteristics of the powertrain shown in FIG. 14a.

DESCRIPTION OF THE PREFERRED EMBODIMENTS

Figures 1A, 1B:
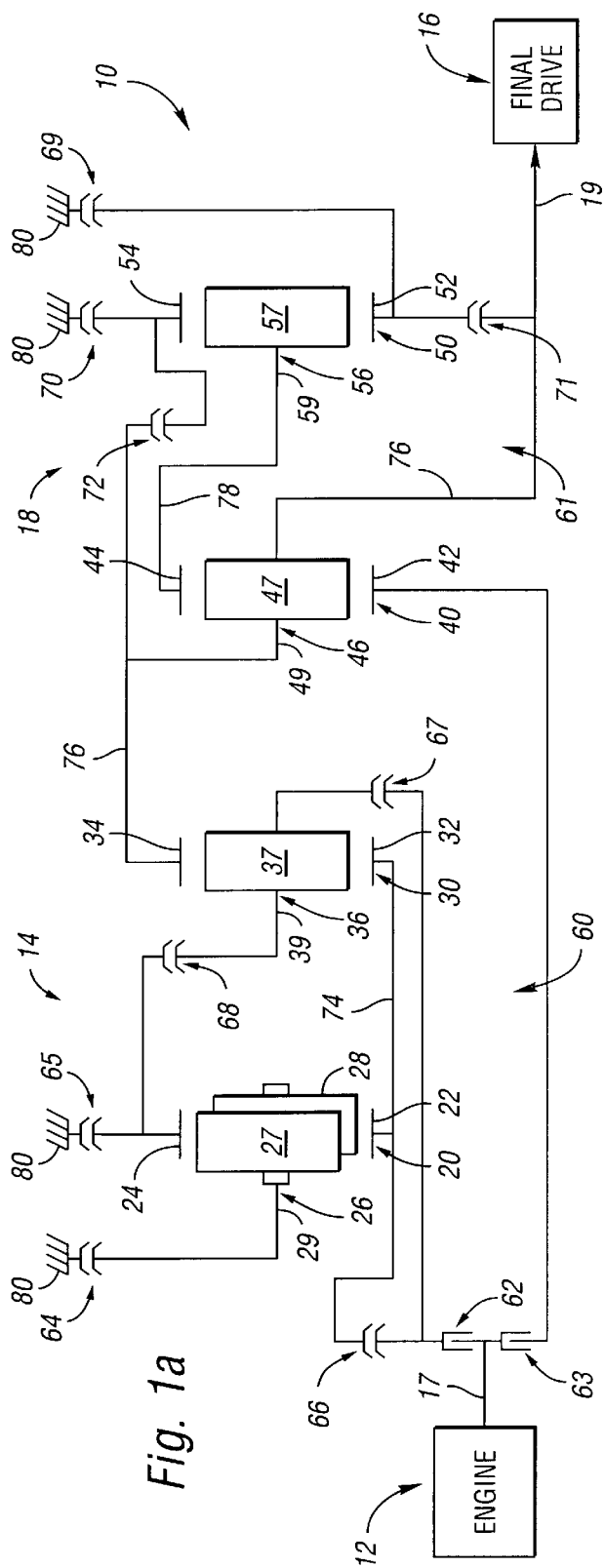

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 continuously connected with the engine 12, a planetary gear arrangement 18, and an output shaft 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of intermeshing pinion gears 27, 28 rotatably mounted on a carrier member 29 and disposed in meshing relationship with the ring gear member 24 and the sun gear member 22, respectively.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear set 50 includes a sun gear member 52, a ring gear member 54, and a planet carrier assembly member 56. The planet carrier assembly member 56 includes a plurality of pinion gears 57 rotatably mounted on a carrier member 59 and disposed in meshing relationship with both the sun gear member 52 and the ring gear member 54.

As a result of the dual clutch arrangement of the invention, the four planetary gear sets 20, 30, 40 and 50 are divided into first and second transmission subsets 60, 61 which are alternatively engaged to provide odd number and even number speed ranges, respectively. Transmission subset 60 includes planetary gear sets 20 and 30, and transmission subset 61 includes planetary gear sets 40 and 50. The output shaft 19 is continuously connected with members of both subsets 60 and 61.

As mentioned above, the first and second input clutches 62, 63 are alternatively engaged for transmitting power from the input shaft 17 to transmission subset 60 or transmission subset 61. The first and second input clutches 62, 63 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 60, 61 prior to engaging the respective input clutches 62, 63. The preselection is achieved by means of electronically controlled synchronizers. As shown, the planetary gear arrangement includes nine torque transmitting mechanisms 64, 65, 66, 67, 68, 69, 70, 71 and 72. The torque transmitting mechanisms 64, 65, 69 and 70 comprise braking synchronizers, and the torque transmitting mechanisms 66, 67, 68, 71 and 72 comprise rotating synchronizers.

By way of example, synchronizers which may be implemented as the rotating and/or braking synchronizers referenced herein are shown in the following patents, each of which are incorporated by reference in their entirety: U.S. Pat. Nos. 5,651,435; 5,975,263; 5,560,461; 5,641,045; 5,497,867; 6,354,416.

The braking synchronizers and rotating synchronizers are referenced in the claims as follows: first and second torque transmitting mechanisms 66, 67; third torque transmitting mechanism 68; fourth and fifth torque transmitting mechanisms 71, 72; sixth and seventh torque transmitting mechanisms 64, 65; eighth and ninth torque transmitting mechanisms 69, 70. Other family members are similarly referenced in the claims (i.e. rotating synchronizers of left, then right, transmission subsets in Figures, and braking synchronizers of left, then right, transmission subsets in Figures).

Accordingly, the input shaft 17 is alternately connected with the first and second transmission subsets 60, 61 (i.e. through the clutch 62 to the rotating synchronizers 66, 67 and through the clutch 63 to the sun gear member 42). The sun gear member 22 is continuously connected with the sun gear member 32 through the interconnecting member 74. The planet carrier assembly member 46 is continuously connected with the ring gear member 34 and the output shaft 19 through the interconnecting member 76. The ring gear member 44 is continuously connected with the planet carrier assembly member 56 through the interconnecting member 78.

The planet carrier assembly member 26 is selectively connectable with the transmission housing 80 through the braking synchronizer 64. The ring gear member 24 is selectively connectable with the transmission housing 80 through the braking synchronizer 65. The sun gear member 22 is selectively connectable with the input shaft 17 through the input clutch 62 and the rotating synchronizer 66. The planet carrier assembly member 36 is selectively connectable with the input shaft 17 through the input clutch 62 and the rotating synchronizer 67. The ring gear member 24 is selectively connectable with the planet carrier assembly member 36 through the rotating synchronizer 68. The sun gear member 52 is selectively connectable with the transmission housing 80 through the braking synchronizer 69. The ring gear member 54 is selectively connectable with the transmission housing 80 through the braking synchronizer 70. The planet carrier assembly member 46 is selectively connectable with the sun gear member 52 through the rotating synchronizer 71. The planet carrier assembly member .46 is selectively connectable with the ring gear member 54 through the rotating synchronizer 72.

As shown in FIG. 1b, and in particular the truth table disclosed therein, the input clutches and torque transmitting mechanisms are selectively engaged in combinations of at least three to provide six forward speed ratios and a reverse speed ratio.

The reverse speed ratio is established with the engagement of the input clutch 62, the braking synchronizer 65 and the rotating synchronizers 66, 68. The input clutch 62 and the rotating synchronizer 66 connect the sun gear member 22 to the input shaft 17. The braking synchronizer 65 connects the ring gear member 24 to the transmission housing 80. The rotating synchronizer 68 connects the ring gear member 24 to the planet carrier assembly member 36. The sun gear members 22, 32 rotate at the same speed as the input shaft 17. The ring gear member 24 and the planet carrier assembly member 36 do not rotate. The ring gear member 34 and the planet carrier assembly member 46 rotate at the same speed as the output shaft 19. The ring gear member 34, and therefore the output shaft 19, rotates at a speed determined from the speed of the sun gear member 32 and the ring gear/sun gear tooth ratio of the planetary gear set 30. The numerical value of the reverse speed ratio is determined utilizing the ring gear/sun gear tooth ratio of the planetary gear set 30.

The first forward speed ratio is established with the engagement of the input clutch 63 and the braking synchronizers 69, 70. The input clutch 63 connects the sun gear member 42 to the input shaft 17. The braking synchronizer 69 connects the sun gear member 52 to the transmission housing 80. The braking synchronizer 70 connects the ring gear member 54 to the transmission housing 80. The sun gear member 42 rotates at the same speed as the input shaft 17. The planet carrier assembly member 46 rotates at the same speed as the output shaft 19. The ring gear member 44 and the planetary gear set 50 do not rotate. The planet carrier assembly member 46, and therefore the output shaft 19, rotates at a speed determined from the speed of the sun gear member 42 and the ring gear/sun gear tooth ratio of the planetary gear set 40. The numerical value of the first forward speed ratio is determined utilizing the ring gear/sun gear tooth ratio of the planetary gear set 40.

The second forward speed ratio is established with the engagement of the input clutch 62, the braking synchronizer 64 and the rotating synchronizers 66, 68. The input clutch 62 and the rotating synchronizer 66 connect the sun gear member 22 to the input shaft 17. The braking synchronizer 64 connects the planet carrier assembly member 26 to the transmission housing 80. The rotating synchronizer 68 connects the ring gear member 24 to the planet carrier assembly member 36. The sun gear members 22, 32 rotate at the same speed as the input shaft 17. The planet carrier assembly member 26 does not rotate. The ring gear member 24 rotates at the same speed as the planet carrier assembly member 36. The ring gear member 24 rotates at a speed determined from the speed of the sun gear member 22 and the ring gear/sun gear tooth ratio of the planetary gear set 20. The ring gear member 34 and the planet carrier assembly member 46 rotate at the same speed as the output shaft 19. The ring gear member 34, and therefore the output shaft 19, rotates at a speed determined from the speed of the planet carrier assembly member 36, the speed of the sun gear member 32 and the ring gear/sun gear tooth ratio of the planetary gear set 30. The numerical value of the second forward speed ratio is determined utilizing the ring gear/sun gear tooth ratios of the planetary gear sets 20, 30.

The third forward speed ratio is established with the engagement of the input clutch 63, the braking synchronizer 69 and the rotating synchronizer 72. The input clutch 63 connects the sun gear member 42 to the input shaft 17. The braking synchronizer 69 connects the sun gear member 52 to the transmission housing 80. The rotating synchronizer 72 connects the planet carrier assembly member 46 to the ring gear member 54. The sun gear member 42 rotates at the same speed as the input shaft 17. The planet carrier assembly member 46 and the ring gear member 54 rotate at the same speed as the output shaft 19. The ring gear member 44 rotates at the same speed as the planet carrier assembly member 56. The planet carrier assembly member 46, and therefore the output shaft 19, rotates at a speed determined from the speed of the ring gear member 44, the speed of the sun gear member 42 and the ring gear/sun gear tooth ratio of the planetary gear set 40. The sun gear member 52 does not rotate. The planet carrier assembly member 56 rotates at a speed determined from the speed of the ring gear member 54 and the ring gear/sun gear tooth ratio of the planetary gear set 50. The numerical value of the third forward speed ratio is determined utilizing the ring gear/sun gear tooth ratios of the planetary gear sets 40, 50.

The fourth forward speed ratio is established with the engagement of the input clutch 62, the braking synchronizer 64 and the rotating synchronizers 67, 68. The input clutch 62 and the rotating synchronizer 67 connect the planet carrier assembly member 36 to the input shaft 17. The braking synchronizer 64 connects the planet carrier assembly member 26 to the transmission housing 80. The rotating synchronizer 68 connects the ring gear member 24 to the planet carrier assembly member 36. The sun gear member 22 rotates at the same speed as the sun gear member 32. The planet carrier assembly member 26 does not rotate. The ring gear member 24 and the planet carrier assembly member 36 rotate at the same speed as the input shaft 17. The sun gear member 22 rotates at a speed determined from the speed of the ring gear member 24 and the ring gear/sun gear tooth ratio of the planetary gear set 20. The ring gear member 34 and the planet carrier assembly member 46 rotate at the same speed as the output shaft 19. The ring gear member 34, and therefore the output shaft 19, rotates at a speed determined from the speed of the planet carrier assembly member 36, the speed of the sun gear member 32 and the ring gear/sun gear tooth ratio of the planetary gear set 30. The numerical value of the fourth forward speed ratio is determined utilizing the ring gear/sun gear tooth ratios of the planetary gear sets 20, 30.

The fifth forward speed ratio is established with the engagement of the input clutch 63 and the rotating synchronizers 71, 72. In this configuration, the input shaft 17 is directly connected to the output shaft 19. The numerical value of the fifth forward speed ratio is 1.

The sixth forward speed ratio is established with the engagement of the input clutch 62, the braking synchronizers 64, 65 and the rotating synchronizer 67. The input clutch 62 and the rotating synchronizer 67 connect the planet carrier assembly member 36 to the input shaft 17. The braking synchronizer 64 connects the planet carrier assembly member 26 to the transmission housing 80. The braking synchronizer 65 connects the ring gear member 24 to the transmission housing 80. The planetary gear set 20 and the sun gear member 32 do not rotate. The planet carrier assembly member 36 rotates at the same speed as the input shaft 17. The ring gear member 34 and the planet carrier assembly member 46 rotate at the same speed as the output shaft 19. The ring gear member 34, and therefore the output shaft 19, rotates at a speed determined from the speed of the planet carrier assembly member 36 and the ring gear/sun gear tooth ratio of the planetary gear set 30. The numerical value of the sixth forward speed ratio is determined utilizing the ring gear/sun gear tooth ratio of the planetary gear set 30.

As set forth above, the engagement schedule for the torque transmitting mechanisms is shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; the R3/S3 value is the tooth ratio of the planetary gear set 40; and the R4/S4 value is the tooth ratio of the planetary gear set 50. Also, the chart of FIG. 1b describes the ratio steps that are attained utilizing the sample of tooth ratios given. For example, the step ratio between first and second forward speed ratios is 1.54, while the step ratio between the reverse and first forward ratio is –0.67. Those skilled in the art will recognize that since torque transmitting mechanisms 66 and 67 are connected to a common member, input clutch 62, and they are not engaged at the same time for any of the speed ratios, the pair can be executed as a double synchronizer to reduce content and cost. Similarly, torque transmitting mechanisms pair 70 and 72 can be implemented as a double synchronizer.

FIG. 2a shows a powertrain 110 having a conventional engine 12, a planetary transmission 114, and a conventional final drive mechanism 16. The planetary transmission 114 includes an input shaft 17 connected with the engine 12, a planetary gear arrangement 118, and an output shaft 19 connected with the final drive mechanism 16. The planetary gear arrangement 118 includes four planetary gear sets 120, 130, 140 and 150.

The planetary gear set 120 includes a sun gear member 122, a ring gear member 124, and a planet carrier assembly member 126. The planet carrier assembly member 126 includes a plurality of intermeshing pinion gears 127, 128 rotatably mounted on a carrier member 129 and disposed in meshing relationship with the ring gear member 124 and the sun gear member 122, respectively.

The planetary gear set 130 includes a sun gear member 132, a ring gear member 134, and a planet carrier assembly member 136. The planet carrier assembly member 136 includes a plurality of intermeshing pinion gears 137, 138 rotatably mounted on a carrier member 139 and disposed in meshing relationship with the ring gear member 134 and the sun gear member 132, respectively.

The planetary gear set 140 includes a sun gear member 142, a ring gear member 144, and a planet carrier assembly member 146. The planet carrier assembly member 146 includes a plurality of intermeshing pinion gears 147, 148 rotatably mounted on a carrier member 149 and disposed in meshing relationship with the ring gear member 144 and the sun gear member 142, respectively.

The planetary gear set 150 includes a sun gear member 152, a ring gear member 154, and a planet carrier assembly member 156. The planet carrier assembly member 156 includes a plurality of pinion gears 157 rotatably mounted on a carrier member 159 and disposed in meshing relationship with both the sun gear member 152 and the ring gear member 154.

As a result of the dual clutch arrangement of the invention, the four planetary gear sets 120, 130, 140 and 150 are divided into first and second transmission subsets 160, 161 which are alternatively engaged to provide odd number and even number speed ranges, respectively. Transmission subset 160 includes planetary gear sets 120 and 130, and transmission subset 161 includes planetary gear sets 140 and 150. The output shaft 19 is continuously connected with members of both subsets 160 and 161.

As mentioned above, the first and second input clutches 162, 163 are alternatively engaged for transmitting power from the input shaft 17 to transmission subset 160 or transmission subset 161. The first and second input clutches 162, 163 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 160, 161 prior to engaging the respective input clutches 162, 163. The preselection is achieved by means of electronically controlled synchronizers. As shown, the planetary gear arrangement includes nine torque transmitting mechanisms 164, 165, 166, 167, 168, 169, 170, 171 and 172. The torque transmitting mechanisms 164, 165, 169 and 170 comprise braking synchronizers, and the torque transmitting mechanisms 166, 167, 168, 171 and 172 comprise rotating synchronizers.

Accordingly, the input shaft 17 is alternately connected with the first and second transmission subsets 160, 161 (i.e. through the clutch 162 to the rotating synchronizers 166, 167 and through the clutch 163 to the ring gear member 144). The sun gear member 122 is continuously connected with the sun gear member 132 through the interconnecting member 174. The planet carrier assembly member 146 is continuously connected with the ring gear member 134 and the output shaft 19 through the interconnecting member 176. The sun gear member 142 is continuously connected with the sun gear member 152 through the interconnecting member 178.

The planet carrier assembly member 126 is selectively connectable with the transmission housing 180 through the braking synchronizer 164. The ring gear member 124 is selectively connectable with the transmission housing 180 through the braking synchronizer 165. The planet carrier assembly member 126 is selectively connectable with the input shaft 17 through the input clutch 162 and the rotating synchronizer 166. The planet carrier assembly member 136 is selectively connectable with the input shaft 17 through the input clutch 162 and the rotating synchronizer 167. The ring gear member 124 is selectively connectable with the planet carrier assembly member 136 through the rotating synchronizer 168. The ring gear member 154 is selectively connectable with the transmission housing 180 through the braking synchronizer 169. The planet carrier assembly member 156 is selectively connectable with the transmission housing 180 through the braking synchronizer 170. The planet carrier assembly member 146 is selectively connectable with the ring gear member 154 through the rotating synchronizer 171. The planet carrier assembly member 146 is selectively connectable with the planet carrier assembly member 156 through the rotating synchronizer 172.

As shown in FIG. 2b, and in particular the truth table disclosed therein, the input clutches and torque transmitting mechanisms are selectively engaged in combinations of at least three to provide six forward speed ratios and a reverse speed ratio.

The reverse speed ratio is established with the engagement of the input clutch 162, the braking synchronizer 165 and the rotating synchronizers 166, 168. The input clutch 162 and the rotating synchronizer 166 connect the planet carrier assembly member 126 to the input shaft 17. The braking synchronizer 165 connects the ring gear member 124 to the transmission housing 180. The rotating synchronizer 168 connects the ring gear member 124 to the planet carrier assembly member 136. The sun gear member 122 rotates at the same speed as the sun gear member 132. The planet carrier assembly member 126 rotates at the same speed as the input shaft 17. The ring gear member 124 and the planet carrier assembly member 136 do not rotate. The sun gear member 122 rotates at a speed determined from the speed of the planet carrier assembly member 126 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the sun gear member 132 and the ring gear/sun gear tooth ratio of the planetary gear set 130. The numerical value of the reverse speed ratio is determined utilizing the ring gear/sun gear tooth ratios of the planetary gear set 120, 130.

The first forward speed ratio is established with the engagement of the input clutch 162, the braking synchronizer 165 and the rotating synchronizers 166, 167. The input clutch 162 and the rotating synchronizers 166, 167 connect the planet carrier assembly members 126 and 136 to the input shaft 17. The braking synchronizer 165 connects the ring gear member 124 to the transmission housing 180. The sun gear member 122 rotates at the same speed as the sun gear member 132. The planet carrier assembly members 126, 136 rotate at the same speed as the input shaft 17. The ring gear member 124 does not rotate. The sun gear member 122 rotates at a speed determined from the speed of the planet carrier assembly member 126 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the planet carrier assembly member 136, the speed of the sun gear member 132 and the ring gear/sun gear tooth ratio of the planetary gear set 130. The numerical value of the first forward speed ratio is determined utilizing the ring gear/sun gear tooth ratios of the planetary gear sets 120, 130.

The second forward speed ratio is established with the engagement of the input clutch 163, the braking synchronizer 169 and the rotating synchronizer 172. The input clutch 163 connects the ring gear member 144 to the input shaft 17. The braking synchronizer 169 connects the ring gear member 154 to the transmission housing 180. The rotating synchronizer 172 connects the planet carrier assembly member 146 to the planet carrier assembly member 156. The sun gear member 142 rotates at the same speed as the sun gear member 152. The planet carrier assembly members 146, 156 rotate at the same speed as the output shaft 19. The ring gear member 144 rotates at the same speed as the input shaft 17. The planet carrier assembly member 146, and therefore the output shaft 19, rotates at a speed determined from the speed of the ring gear member 144, the speed of the sun gear member 142 and the ring gear/sun gear tooth ratio of the planetary gear set 140. The ring gear member 154 does not rotate. The planet carrier assembly member 156 rotates at a speed determined from the speed of the sun gear member 152 and the ring gear/sun gear tooth ratio of the planetary gear set 150. The numerical value of the second forward speed ratio is determined utilizing the ring gear/sun gear tooth ratios of the planetary gear sets 140, 150.

The third forward speed ratio is established with the engagement of the input clutch 162, the braking synchronizers 164, 165 and the rotating synchronizer 167. The input clutch 162 and the rotating synchronizer 167 connect the planet carrier assembly member 136 to the input shaft 17. The braking synchronizer 164 connects the planet carrier assembly member 126 to the transmission housing 180. The braking synchronizer 165 connects the ring gear member 124 to the transmission housing 180. The planetary gear set 120 and the sun gear member 132 do not rotate. The planet carrier assembly member 136 rotates at the same speed as the input shaft 17. The ring gear member 134 and the planet carrier assembly member 146 rotate at the same speed as the output shaft 19. The ring gear member 134, and therefore the output shaft 19, rotates at a speed determined from the speed of the planet carrier assembly member 136 and the ring gear/sun gear tooth ratio of the planetary gear set 130. The numerical value of the third forward speed ratio is determined utilizing the ring gear/sun gear tooth ratio of the planetary gear set 130.

The fourth forward speed ratio is established with the engagement of the input clutch 163 and the rotating synchronizers 171, 172. In this configuration, the input shaft 17 is directly connected to the output shaft 19. The numerical value of the fourth forward speed ratio is 1.

The fifth forward speed ratio is established with the engagement of the input clutch 162, the braking synchronizer 164 and the rotating synchronizers 167, 168. The input clutch 162 and the rotating synchronizer 167 connect the planet carrier assembly member 136 to the input shaft 17. The braking synchronizer 164 connects the planet carrier assembly member 126 to the transmission housing 180. The rotating synchronizer 168 connects the ring gear member 124 to the planet carrier assembly member 136. The sun gear member 122 rotates at the same speed as the sun gear member 132. The planet carrier assembly member 126 does not rotate. The ring gear member 124 and the planet carrier assembly member 136 rotate at the same speed as the input shaft 17. The sun gear member 122 rotates at a speed determined from the speed of the ring gear member 124 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the planet carrier assembly member 136, the speed of the sun gear member 132 and the ring gear/sun gear tooth ratio of the planetary gear set 130. The numerical value of the fifth forward speed ratio is determined utilizing the ring gear/sun gear tooth ratios of the planetary gear sets 120, 130.

The sixth forward speed ratio is established with the engagement of the input clutch 163 and the braking synchronizers 169, 170. The input clutch 163 connects the ring gear member 144 to the input shaft 17. The braking synchronizer 169 connects the ring gear member 154 to the transmission housing 180. The braking synchronizer 170 connects the planet carrier assembly member 156 to the transmission housing 180. The sun gear member 142 and the planetary gear set 150 do not rotate. The planet carrier assembly member 146 rotates at the same speed as the output shaft 19. The ring gear member 144 rotates at the same speed as the input shaft 17. The planet carrier assembly member 146, and therefore the output shaft 19, rotates at a speed determined from the speed of the ring gear member 144 and the ring gear/sun gear tooth ratio of the planetary gear set 140. The numerical value of the sixth forward speed ratio is determined utilizing the ring gear/sun gear tooth ratio of the planetary gear set 140.

As set forth above, the truth table of FIG. 2b describes the engagement sequence of the torque transmitting mechanisms utilized to provide a reverse drive ratio and six forward speed ratios. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; the R3/S3 value is the tooth ratio of the planetary gear set 140; and the R4/S4 value is the tooth ratio of the planetary gear set 150. Also shown in FIG. 2b are the ratio steps between single step ratios in the forward direction as well as the reverse to first ratio step. For example, the first to second step ratio is 1.90. Those skilled in the art will recognize that since torque transmitting mechanisms 164 and 166 are connected to a common member, planet carrier assembly member 126, and they are not engaged at the same time for any of the speed ratios, the pair can be executed as a double synchronizer to reduce content and cost. Similarly, torque transmitting mechanisms pair 169 and 171 can be implemented as a double synchronizer.

Turning the FIG. 3a, a powertrain 210 having a conventional engine 12, a planetary transmission 214, and conventional final drive mechanism 16 is shown.

The planetary transmission 214 includes an input shaft 17 continuously connected with the engine 12, a planetary gear arrangement 218, and an output shaft 19 continuously connected with the final drive mechanism 16. The planetary gear arrangement 218 includes four planetary gear sets 220, 230, 240 and 250.

The planetary gear set 220 includes a sun gear member 222, a ring gear member 224, and a planet carrier assembly member 226. The planet carrier assembly member 226 includes a plurality of intermeshing pinion gears 227, 228 rotatably mounted on a carrier member 229 and disposed in meshing relationship with the ring gear member 224 and the sun gear member 222, respectively.

The planetary gear set 230 includes a sun gear member 232, a ring gear member 234, and a planet carrier assembly member 236. The planet carrier assembly member 236 includes a plurality of intermeshing pinion gears 237, 238 rotatably mounted on a carrier member 239 and disposed in meshing relationship with the ring gear member 234 and the sun gear member 232, respectively.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear set 250 includes a sun gear member 252, a ring gear member 254, and a planet carrier assembly member 256. The planet carrier assembly member 256 includes a plurality of pinion gears 257 rotatably mounted on a carrier member 259 and disposed in meshing relationship with both the sun gear member 252 and the ring gear member 254.

As a result of the dual clutch arrangement of the invention, the four planetary gear sets 220, 230, 240 and 250 are divided into first and second transmission subsets 260, 261 which are alternatively engaged to provide odd number and even number speed ranges, respectively. Transmission subset 260 includes planetary gear sets 220 and 230, and transmission subset 261 includes planetary gear sets 240 and 250. The output shaft 19 is continuously connected with members of both subsets 260 and 261.

As mentioned above, the first and second input clutches 262, 263 are alternatively engaged for transmitting power from the input shaft 17 to transmission subset 260 or transmission subset 261. The first and second input clutches 262, 263 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 260, 261 prior to engaging the respective input clutches 262, 263. The preselection is achieved by means of electronically controlled synchronizers. As shown, the planetary gear arrangement includes nine torque transmitting mechanisms 264, 265, 266, 267, 268, 269, 270, 271 and 272. The torque transmitting mechanisms 264, 265, 269 and 270 comprise braking synchronizers, and the torque transmitting mechanisms 266, 267, 268, 271 and 272 comprise rotating synchronizers.

Accordingly, the input shaft 17 is alternately connected with the first and second transmission subsets 260, 261 (i.e. through the clutch 262 to the rotating synchronizers 266, 267 and through the clutch 263 to the sun gear member 242). The sun gear member 222 is continuously connected with the sun gear member 232 through the interconnecting member 274. The planet carrier assembly member 246 is continuously connected with the ring gear member 234 and the output shaft 19 through the interconnecting member 276. The ring gear member 244 is continuously connected with the ring gear member 254 through the interconnecting member 278.

The planet carrier assembly member 226 is selectively connectable with the transmission housing 280 through the braking synchronizer 264. The ring gear member 224 is selectively connectable with the transmission housing 280 through the braking synchronizer 265. The planet carrier assembly member 226 is selectively connectable with the input shaft 17 through the input clutch 262 and the rotating synchronizer 266. The planet carrier assembly member 236 is selectively connectable with the input shaft 17 through the input clutch 262 and the rotating synchronizer 267. The ring gear member 224 is selectively connectable with the planet carrier assembly member 236 through the rotating synchronizer 268. The planet carrier assembly member 256 is selectively connectable with the transmission housing 280 through the braking synchronizer 269. The sun gear member 252 is selectively connectable with the transmission housing 280 through the braking synchronizer 270. The planet carrier assembly member 246 is selectively connectable with the planet carrier assembly member 256 through the rotating synchronizer 271. The planet carrier assembly member 246 is selectively connectable with the sun gear member 252 through the rotating synchronizer 272.

As shown in FIG. 3b, and in particular the truth table disclosed therein, the input clutches and torque transmitting mechanisms are selectively engaged in combinations of at least three to provide six forward speed ratios and a reverse speed ratio.

The reverse speed ratio is established with the engagement of the input clutch 262, the braking synchronizer 265 and the rotating synchronizers 266, 268. The input clutch 262 and the rotating synchronizer 266 connect the planet carrier assembly member 226 to the input shaft 17. The braking synchronizer 265 connects the ring gear member 224 to the transmission housing 280. The rotating synchronizer 268 connects the ring gear member 224 to the planet carrier assembly member 236. The sun gear member 222 rotates at the same speed as the sun gear member 232. The planet carrier assembly member 226 rotates at the same speed as the input shaft 17. The ring gear member 224 and the planet carrier assembly member 236 do not rotate. The sun gear member 222 rotates at a speed determined from the speed of the planet carrier assembly member 226 and the ring gear/sun gear tooth ratio of the planetary gear set 220. The ring gear member 234 and the planet carrier assembly member 246 rotate at the same speed as the output shaft 19. The ring gear member 234, and therefore the output shaft 19, rotates at a speed determined from the speed of the sun gear member 232 and the ring gear/sun gear tooth ratio of the planetary gear set 230. The numerical value of the reverse speed ratio is determined utilizing the ring gear/sun gear tooth ratios of the planetary gear sets 220, 230.

The first forward speed ratio is established with the engagement of the input clutch 262, the braking synchronizer 265 and the rotating synchronizers 266, 267. The input clutch 262 and the rotating synchronizers 266, 267 connect the planet carrier assembly members 226, 236 to the input shaft 17. The braking synchronizer 265 connects the ring gear member 224 to the transmission housing 280. The sun gear member 222 rotates at the same speed as the sun gear member 232. The planet carrier assembly members 226, 236 rotate at the same speed as the input shaft 17. The ring gear member 224 does not rotate. The sun gear member 222 rotates at a speed determined from the speed of the planet carrier assembly member 226 and the ring gear/sun gear tooth ratio of the planetary gear set 220. The ring gear member 234 and the planet carrier assembly member 246 rotate at the same speed as the output shaft 19. The ring gear member 234, and therefore the output shaft 19, rotates at a speed determined from the speed of the planet carrier assembly member 236, the speed of the sun gear member 232 and the ring gear/sun gear tooth ratio of the planetary gear set 230. The numerical value of the first forward speed ratio is determined utilizing the ring gear/sun gear tooth ratios of the planetary gear sets 220, 230.

The second forward speed ratio is established with the engagement of the input clutch 263, the braking synchronizer 269 and the rotating synchronizer 272. The input clutch 263 connects the sun gear member 242 to the input shaft 17. The braking synchronizer 269 connects the planet carrier assembly member 256 to the transmission housing 280. The rotating synchronizer 272 connects the planet carrier assembly member 246 to the sun gear member 252. The sun gear member 242 rotates at the same speed as the input shaft 17. The planet carrier assembly member 246 and the sun gear member 252 rotate at the same speed as the output shaft 19. The ring gear member 244 rotates at the same speed as the ring gear member 254. The planet carrier assembly member 246, and therefore the output shaft 19, rotates at a speed determined from the speed of the ring gear member 244, the speed of the sun gear member 242 and the ring gear/sun gear tooth ratio of the planetary gear set 240. The planet carrier assembly member 256 does not rotate. The ring gear member 254 rotates at a speed determined from the speed of the sun gear member 252 and the ring gear/sun gear tooth ratio of the planetary gear set 250. The numerical value of the second forward speed ratio is determined utilizing the ring gear/sun gear tooth ratios of the planetary gear sets 240, 250.

The third forward speed ratio is established with the engagement of the input clutch 262, the braking synchronizers 264, 265 and the rotating synchronizer 267. The input clutch 262 and the rotating synchronizer 267 connect the planet carrier assembly member 236 to the input shaft 17. The braking synchronizer 264 connects the planet carrier assembly member 226 to the transmission housing 280. The braking synchronizer 265 connects the ring gear member 224 to the transmission housing 280. The planetary gear set 220 and the sun gear member 232 do not rotate. The planet carrier assembly member 236 rotates at the same speed as the input shaft 17. The ring gear member 234 and the planet carrier assembly member 246 rotate at the same speed as the output shaft 19. The ring gear member 234, and therefore the output shaft 19, rotates at a speed determined from the speed of the planet carrier assembly member 236 and the ring gear/sun gear tooth ratio of the planetary gear set 230. The numerical value of the third forward speed ratio is determined utilizing the ring gear/sun gear tooth ratio of the planetary gear set 230.

The fourth forward speed ratio is established with the engagement of the input clutch 263 and the rotating synchronizers 271, 272. In this configuration, the input shaft 17 is directly connected to the output shaft 19. The numerical value of the fourth forward speed ratio is 1.

The fifth forward speed ratio is established with the engagement of the input clutch 262, the braking synchronizer 264 and the rotating synchronizers 267, 268. The input clutch 262 and the rotating synchronizer 267 connect the planet carrier assembly member 236 to the input shaft 17. The braking synchronizer 264 connects the planet carrier assembly member 226 to the transmission housing 280. The rotating synchronizer 268 connects the ring gear member 224 to the planet carrier assembly member 236. The sun gear member 222 rotates at the same speed as the sun gear member 232. The planet carrier assembly member 226 does not rotate. The ring gear member 224 and the planet carrier assembly member 236 rotate at the same speed as the input shaft 17. The sun gear member 222 rotates at a speed determined from the speed of the ring gear member 224 and the ring gear/sun gear tooth ratio of the planetary gear set 220. The ring gear member 234 and the planet carrier assembly member 246 rotate at the same speed as the output shaft 19. The ring gear member 234, and therefore the output shaft 19, rotates at a speed determined from the speed of the planet carrier assembly member 236, the speed of the sun gear member 232 and the ring gear/sun gear tooth ratio of the planetary gear set 230. The numerical value of the fifth forward speed ratio is determined utilizing the ring gear/sun gear tooth ratios of the planetary gear sets 220, 230.

The sixth forward speed ratio is established with the engagement of the input clutch 263, the braking synchronizer 270 and the rotating synchronizer 271. The input clutch 263 connects the sun gear member 242 to the input shaft 17. The braking synchronizer 270 connects the sun gear member 252 to the transmission housing 280. The rotating synchronizer 271 connects the planet carrier assembly member 246 to the planet carrier assembly member 256. The sun gear member 242 rotates at the same speed as the input shaft 17. The planet carrier assembly members 246, 256 rotate at the same speed as the output shaft 19. The ring gear member 244 rotates at the same speed as the ring gear member 254. The planet carrier assembly member 246, and therefore the output shaft 19, rotates at a speed determined from the speed of the ring gear member 244, the speed of the sun gear member 242 and the ring gear/sun gear tooth ratio of the planetary gear set 240. The sun gear member 252 does not rotate. The planet carrier assembly member 256 rotates at a speed determined from the speed of the ring gear member 254 and the ring gear/sun gear tooth ratio of the planetary gear set 250. The numerical value of the sixth forward speed ratio is determined utilizing the ring gear/sun gear tooth ratios of the planetary gear sets 240, 250.

As previously set forth, the truth table of FIG. 3b describes the combinations of engagements utilized for six forward speed ratios and one reverse speed ratio. The truth table also provides an example of speed ratios that are available with the family member described above. These examples of speed ratios are determined the tooth ratios given in FIG. 3b. The R1/S1 value is the tooth ratio of the planetary gear set 220; the R2/S2 value is the tooth ratio of the planetary gear set 230; the R3/S3 value is the tooth ratio of the planetary gear set 240; and the R4/S4 value is the tooth ratio of the planetary gear set 250. Also depicted in FIG. 3b is a chart representing the ratio steps between adjacent forward speed ratios and the reverse speed ratio. For example, the first to second ratio interchange has a step of 1.53.

Figures 4A, 4B:
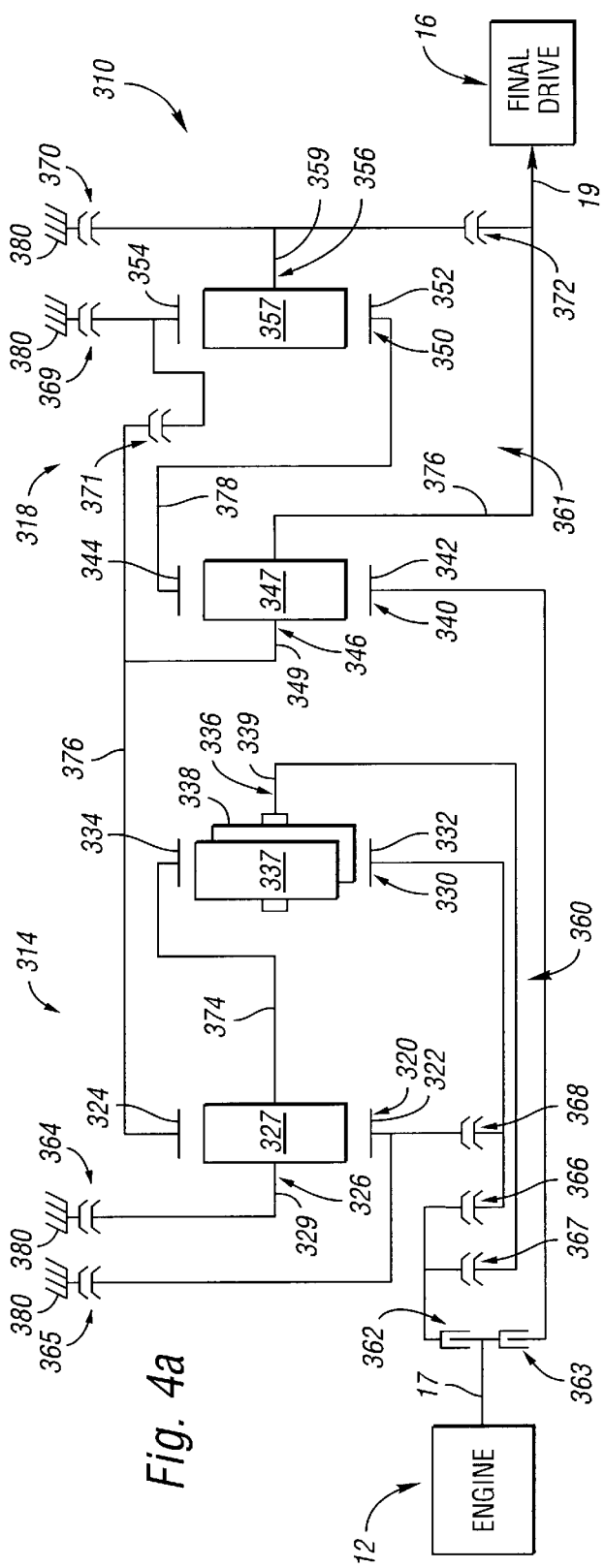

A powertrain 310, shown in FIG. 4a, includes the engine 12, a planetary transmission 314, and the final drive mechanism 16. The planetary transmission 314 includes an input shaft 17 continuously connected with the engine 12, a planetary gear arrangement 318, and an output shaft 19 continuously connected with the final drive mechanism 16.

The planetary gear arrangement 318 includes four planetary gear sets 320, 330, 340 and 350.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of intermeshing pinion gears 337, 338 rotatably mounted on a carrier member 339 and disposed in meshing relationship with the ring gear member 334 and the sun gear member 332, respectively.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear set 350 includes a sun gear member 352, a ring gear member 354, and a planet carrier assembly member 356. The planet carrier assembly member 356 includes a plurality of pinion gears 357 rotatably mounted on a carrier member 359 and disposed in meshing relationship with both the sun gear member 352 and the ring gear member 354.

As a result of the dual clutch arrangement of the invention, the four planetary gear sets 320, 330, 340 and 350 are divided into first and second transmission subsets 360, 361 which are alternatively engaged to provide odd number and even number speed ranges, respectively. Transmission subset 360 includes planetary gear sets 320 and 330, and transmission subset 361 includes planetary gear sets 340 and 350. The output shaft 19 is continuously connected with members of both subsets 360 and 361.

As mentioned above, the first and second input clutches 362, 363 are alternatively engaged for transmitting power from the input shaft 17 to transmission subset 360 or transmission subset 361. The first and second input clutches 362, 363 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 360, 361 prior to engaging the respective input clutches 362, 363. The preselection is achieved by means of electronically controlled synchronizers. As shown, the planetary gear arrangement includes nine torque transmitting mechanisms 364, 365, 366, 367, 368, 369, 370, 371 and 372. The torque transmitting mechanisms 364, 365, 369 and 370 comprise braking synchronizers, and the torque transmitting mechanisms 366, 367, 368, 371 and 372 comprise rotating synchronizers.

Accordingly, the input shaft 17 is alternately connected with the first and second transmission subsets 360, 361 (i.e. through the clutch 362 to the rotating synchronizers 366, 367 and through the clutch 363 to the sun gear member 342). The planet carrier assembly member 326 is continuously connected with the ring gear member 334 through the interconnecting member 374. The planet carrier assembly member 346 is continuously connected with the ring gear member 324 and the output shaft 19 through the interconnecting member 376. The ring gear member 344 is continuously connected with the sun gear member 352 through the interconnecting member 378.

The planet carrier assembly member 326 is selectively connectable with the transmission housing 380 through the braking synchronizer 364. The sun gear member 322 is selectively connectable with the transmission housing 380 through the braking synchronizer 365. The sun gear member 332 is selectively connectable with the input shaft 17 through the input clutch 362 and the rotating synchronizer 366. The planet carrier assembly member 336 is selectively connectable with the input shaft 17 through the input clutch 362 and the rotating synchronizer 367. The sun gear member 322 is selectively connectable with the sun gear member 332 through the rotating synchronizer 368. The ring gear member 354 is selectively connectable with the transmission housing 380 through the braking synchronizer 369. The planet carrier assembly member 356 is selectively connectable with the transmission housing 380 through the braking synchronizer 370. The planet carrier assembly member 346 is selectively connectable with the ring gear member 354 through the rotating synchronizer 371. The planet carrier assembly member 346 is selectively connectable with the planet carrier assembly member 356 through the rotating synchronizer 372.

The truth tables given in FIGS. 4b, 5b, 6b, 7b, 8b, 9b, 10b, 11b, 12b, 13b and 14b show the engagement sequences for the torque transmitting mechanisms to provide at least five forward speed ratios and one reverse speed ratio. As shown and described above for the configurations in FIGS. 1a, 2a and 3a, those skilled in the art will understand from the respective truth tables how the speed ratios are established through the planetary gear sets identified in the written description.

The truth table shown in FIG. 4b describes the engagement combination and engagement sequence necessary to provide the reverse drive ratio and six forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; the R3/S3 value is the tooth ratio for the planetary gear set 340; and the R4/S4 value is the tooth ratio for the planetary gear set 350. Also given in FIG. 4b is a chart describing the step ratios between the adjacent forward speed ratios and the reverse to first forward speed ratio. For example, the first to second forward speed ratio step is 1.48.

Those skilled in the art will recognize that the numerical values of the reverse and sixth forward speed ratios are determined utilizing the ring gear/sun gear tooth ratio of the planetary gear set 320. The numerical value of the first forward speed ratio is determined utilizing the ring gear/sun gear tooth ratio of the planetary gear set 340. The numerical values of the second and fourth forward speed ratios are determined utilizing the ring gear/sun gear tooth ratios of the planetary gear sets 320, 330. The numerical value of the third forward speed ratio is determined utilizing the ring gear/sun gear tooth ratios of the planetary gear sets 340, 350. The numerical value of the fifth forward speed ratio is 1.

Figures 5A, 5B:
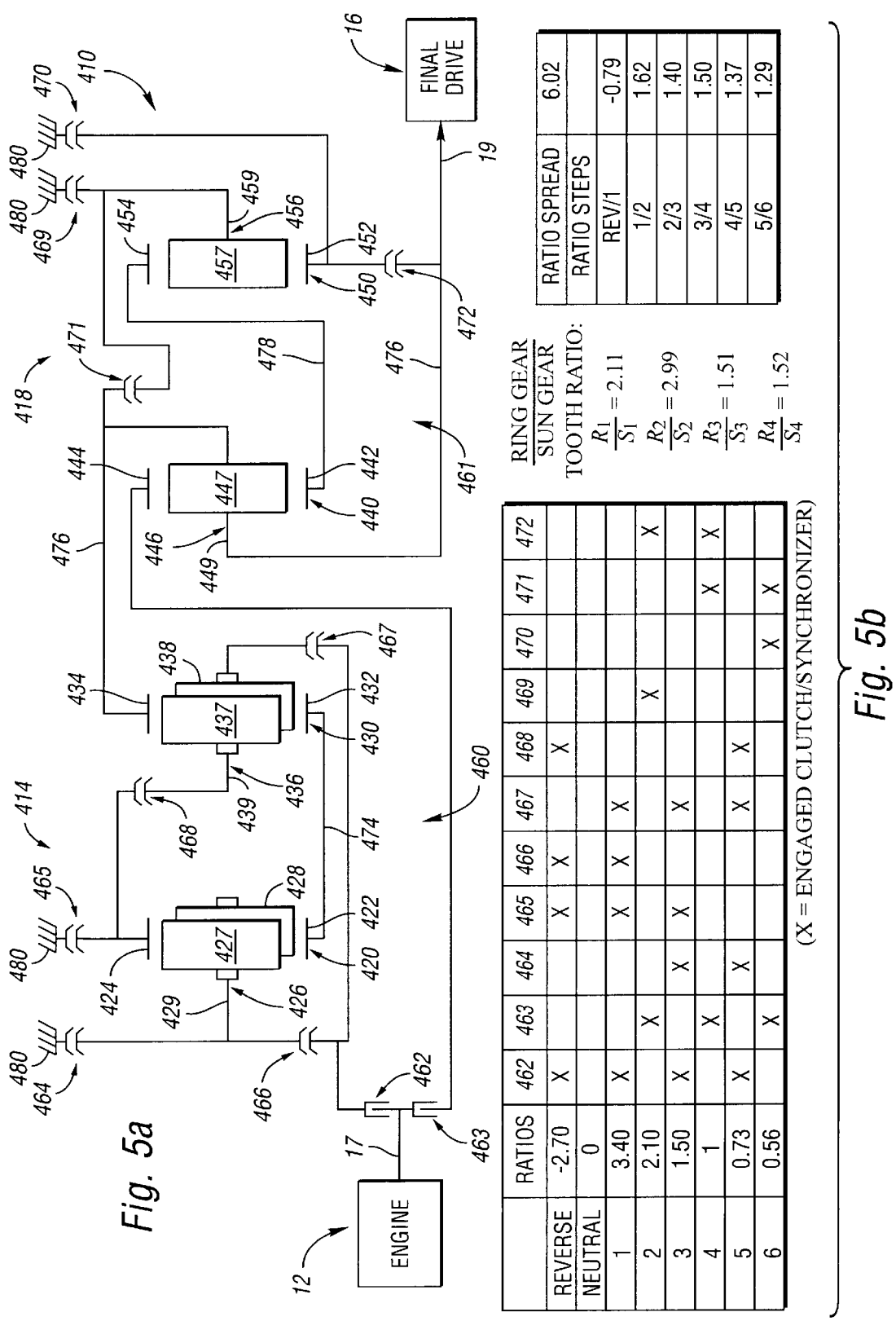

A powertrain 410 shown in FIG. 5a includes a conventional engine 12, a planetary transmission 414, and a conventional final drive mechanism 16. The planetary transmission 414 includes an input shaft 17 connected with the engine 12, a planetary gear arrangement 418, and an output shaft 19 continuously connected with the final drive mechanism 16. The planetary gear arrangement 418 includes four planetary gear sets 420, 430, 440 and 450.

The planetary gear set 420 includes a sun gear member 422, a ring gear member 424, and a planet carrier assembly member 426. The planet carrier assembly member 426 includes a plurality of intermeshing pinion gears 427, 428 rotatably mounted on a carrier member 429 and disposed in meshing relationship with the ring gear member 424 and the sun gear member 422, respectively.

The planetary gear set 430 includes a sun gear member 432, a ring gear member 434, and a planet carrier assembly member 436. The planet carrier assembly member 436 includes a plurality of intermeshing pinion gears 437, 438 rotatably mounted on a carrier member 439 and disposed in meshing relationship with the ring gear member 434 and the sun gear member 432, respectively.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear set 450 includes a sun gear member 452, a ring gear member 454, and a planet carrier assembly member 456. The planet carrier assembly member 456 includes a plurality of pinion gears 457 rotatably mounted on a carrier member 459 and disposed in meshing relationship with both the sun gear member 452 and the ring gear member 454.

As a result of the dual clutch arrangement of the invention, the four planetary gear sets 420, 430, 440 and 450 are divided into first and second transmission subsets 460, 461 which are alternatively engaged to provide odd number and even number speed ranges, respectively. Transmission subset 460 includes planetary gear sets 420 and 430, and transmission subset 461 includes planetary gear sets 440 and 450. The output shaft 19 is continuously connected with members of both subsets 460 and 461.

As mentioned above, the first and second input clutches 462, 463 are alternatively engaged for transmitting power from the input shaft 17 to transmission subset 460 or transmission subset 461. The first and second input clutches 462, 463 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 460, 461 prior to engaging the respective input clutches 462, 463. The preselection is achieved by means of electronically controlled synchronizers. As shown, the planetary gear arrangement includes nine torque transmitting mechanisms 464, 465, 466, 467, 468, 469, 470, 471 and 472. The torque transmitting mechanisms 464, 465, 469 and 470 comprise braking synchronizers, and the torque transmitting mechanisms 466, 467, 468, 471 and 472 comprise rotating synchronizers.

Accordingly, the input shaft 17 is alternately connected with the first and second transmission subsets 460, 461 (i.e. through the clutch 462 to the rotating synchronizers 466, 467 and through the clutch 463 to the ring gear member 444). The sun gear member 422 is continuously connected with the sun gear member 432 through the interconnecting member 474. The planet carrier assembly member 446 is continuously connected with the ring gear member 434 and the output shaft 19 through the interconnecting member 476. The sun gear member 442 in continuously connected with the ring gear member 454 through the interconnecting member 478.

The planet carrier assembly member 426 is selectively connectable with the transmission housing 480 through the braking sychronizer 464. The ring gear member 424 is selectively connectable with the transmission housing 480 through the braking sychronizer 465. The planet carrier assembly member 426 is selectively connectable with the input shaft 17 through the input clutch 462 and the rotating synchronizer 466. The planet carrier assembly member 436 is selectively connectable with the input shaft 17 through the input clutch 462 and the rotating synchronizer 467. The ring gear member 424 is selectively connectable with the planet carrier assembly member 436 through the rotating synchronizer 468. The planet carrier assembly member 456 is selectively connectable with the transmission housing 480 through the braking synchronizer 469. The sun gear member 452 is selectively connectable with the transmission housing 480 through the braking synchronizer 470. The planet carrier assembly member 446 is selectively connectable with the planet carrier assembly member 456 through the rotating synchronizer 471. The planet carrier assembly member 446 is selectively connectable with the sun gear member 452 through the rotating synchronizer 472.

As shown in FIG. 5b, and in particular the truth table disclosed therein, the input clutches and torque transmitting mechanisms are selectively engaged in combinations of at least three to provide six forward speed ratios and a reverse speed ratio.

FIG. 5b also provides a chart of the ratio steps between adjacent forward ratios and between the reverse and first ratio. For example, the ratio step between the first and second forward ratios is 1.62. Those skilled in the art will recognize that the numerical values of the reverse, first and fifth forward speed ratios are determined utilizing the ring gear/sun gear tooth ratios of the planetary gear sets 420, 430. The numerical values of the second and sixth forward speed ratios are determined utilizing the ring gear/sun gear tooth ratios of the planetary gear set 440, 450. The numerical value of the third forward speed ratio is determined utilizing the ring gear/sun gear tooth ratio of the planetary gear set 430. The numerical value of the fourth forward speed ratio is 1.

A powertrain 510, shown in FIG. 6a, includes a conventional engine 12, a powertrain 514, and a conventional final drive mechanism 16. The powertrain 514 includes an input shaft 17 connected with the engine 12, a planetary gear arrangement 518, and an output shaft 19 continuously connected with the final drive mechanism 16. The planetary gear arrangement 518 includes four planetary gear sets 520, 530, 540 and 550.

The planetary gear set 520 includes a sun gear member 522, a ring gear member 524, and a planet carrier assembly member 526. The planet carrier assembly member 526 includes a plurality of intermeshing pinion gears 527, 528 rotatably mounted on a carrier member 529 and disposed in meshing relationship with the ring gear member 524 and the sun gear member 522, respectively.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of intermeshing pinion gears 547, 548 rotatably mounted on a carrier member 549 and disposed in meshing relationship with the ring gear member 544 and the sun gear member 542, respectively.

The planetary gear set 550 includes a sun gear member 552, a ring gear member 554, and a planet carrier assembly member 556. The planet carrier assembly member 556 includes a plurality of pinion gears 557 rotatably mounted on a carrier member 559 and disposed in meshing relationship with both the sun gear member 552 and the ring gear member 554.

As a result of the dual clutch arrangement of the invention, the four planetary gear sets 520, 530, 540 and 550 are divided into first and second transmission subsets 560, 561 which are alternatively engaged to provide odd number and even number speed ranges, respectively. Transmission subset 560 includes planetary gear sets 520 and 530, and transmission subset 561 includes planetary gear sets 540 and 550. The output shaft 19 is continuously connected with members of both subsets 560 and 561.

As mentioned above, the first and second input clutches 562, 563 are alternatively engaged for transmitting power from the input shaft 17 to transmission subset 560 or transmission subset 561. The first and second input clutches 562, 563 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 560, 561 prior to engaging the respective input clutches 562, 563. The preselection is achieved by means of electronically controlled synchronizers. As shown, the planetary gear arrangement includes nine torque transmitting mechanisms 564, 565, 566, 567, 568, 569, 570, 571 and 572. The torque transmitting mechanisms 564, 565, 569 and 570 comprise braking synchronizers, and the torque transmitting mechanisms 566, 567, 568, 571 and 572 comprise rotating synchronizers.

Accordingly, the input shaft 17 is alternately connected with the first and second transmission subsets 560, 561 (i.e. through the clutch 562 to the rotating synchronizers 566, 567 and through the clutch 563 to the ring gear member 544). The sun gear member 522 is continuously connected with the sun gear member 532 through the interconnecting member 574. The planet carrier assembly member 546 is continuously connected with the ring gear member 534 and the output shaft 19 through the interconnecting member 576. The sun gear member 542 is continuously connected with the sun gear member 552 through the interconnecting member 578.

The planet carrier assembly member 526 is selectively connectable with the transmission housing 580 through the braking synchronizer 564. The ring gear member 524 is selectively connectable with the transmission housing 580 through the braking synchronizer 565. The sun gear member 522 is selectively connectable with the input shaft 17 through the input clutch 562 and the rotating synchronizer 566. The planet carrier assembly member 536 is selectively connectable with the input shaft 17 through the input clutch 562 and the rotating synchronizer 567. The ring gear member 524 is selectively connectable with the planet carrier assembly member 536 through the rotating synchronizer 568. The ring gear member 554 is selectively connectable with the transmission housing 580 through the braking synchronizer 569. The planet carrier assembly member 556 is selectively connectable with the transmission housing 580 through the braking synchronizer 570. The planet carrier assembly member 546 is selectively connectable with the ring gear member 554 through the rotating synchronizer 571. The planet carrier assembly member 546 is selectively connectable with the planet carrier assembly member 556 through the rotating synchronizer 572.

As shown in FIG. 6b, and in particular the truth table disclosed therein, the input clutches and torque transmitting mechanisms are selectively engaged in combinations of at least three to provide six forward speed ratios and a reverse speed ratio. The chart of FIG. 6b describes the ratio steps between adjacent forward speed ratios and the ratio step between the reverse and first forward speed ratio.

Those skilled in the art, upon reviewing the truth table and the schematic representation of FIG. 6a can determine that the numerical values of the reverse and fifth forward speed ratios are determined utilizing the ring gear/sun gear tooth ratio of the planetary gear set 530. The numerical values of the first and third forward speed ratios are determined utilizing the ring gear/sun gear tooth ratios of the planetary gear sets 520, 530. The numerical value of the second forward speed ratio is determined utilizing the ring gear/sun gear tooth ratios of the planetary gear sets 540, 550. The numerical value of the fourth forward speed ratio is 1. The numerical value of the sixth forward speed ratio is determined utilizing the ring gear/sun gear tooth ratio of the planetary gear set 540.

The sample speed ratios given in the truth table are determined utilizing the tooth ratio values also given in FIG. 6b. R1/S1 value is the tooth ratio of the planetary gear set 520; the R2/S2 value is the tooth ratio of the planetary gear set 530; the R3/S3 value is the tooth ratio of the planetary gear set 540; and the R4/S4 value is the tooth ratio of the planetary gear set 550.

A powertrain 610, shown in FIG. 7a, has the engine 12, a planetary transmission 614, and the final drive mechanism 16. The planetary transmission 614 includes the input shaft 17, a planetary gear arrangement 618, and the output shaft 19. The planetary gear arrangement 618 includes four planetary gear sets 620, 630, 640 and 650.

The planetary gear set 620 includes a sun gear member 622, a ring gear member 624, and a planet carrier assembly member 626. The planet carrier assembly member 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of intermeshing pinion gears 637, 638 rotatably mounted on a carrier member 639 and disposed in meshing relationship with the ring gear member 634 and the sun gear member 632, respectively.

The planetary gear set 640 includes a sun gear member 642, a ring gear member 644, and a planet carrier assembly member 646. The planet carrier assembly member 646 includes a plurality of intermeshing pinion gears 647, 648 rotatably mounted on a carrier member 649 and disposed in meshing relationship with the ring gear member 644 and the sun gear member 642, respectively.

The planetary gear set 650 includes a sun gear member 652, a ring gear member 654, and a planet carrier assembly member 656. The planet carrier assembly member 656 includes a plurality of pinion gears 657 rotatably mounted on a carrier member 659 and disposed in meshing relationship with both the sun gear member 652 and the ring gear member 654.

As a result of the dual clutch arrangement of the invention, the four planetary gear sets 620, 630, 640 and 650 are divided into first and second transmission subsets 660, 661 which are alternatively engaged to provide odd number and even number speed ranges, respectively. Transmission subset 660 includes planetary gear sets 620 and 630, and transmission subset 661 includes planetary gear sets 640 and 650. The output shaft 19 is continuously connected with members of both subsets 660 and 661.

As mentioned above, the first and second input clutches 662, 663 are alternatively engaged for transmitting power from the input shaft 17 to transmission subset 660 or transmission subset 661. The first and second input clutches 662, 663 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 660, 661 prior to engaging the respective input clutches 662, 663. The preselection is achieved by means of electronically controlled synchronizers. As shown, the planetary gear arrangement includes nine torque transmitting mechanisms 664, 665, 666, 667, 668, 669, 670, 671 and 672. The torque transmitting mechanisms 664, 665, 669 and 670 comprise braking synchronizers, and the torque transmitting mechanisms 666, 667, 668, 671 and 672 comprise rotating synchronizers.

Accordingly, the input shaft 17 is alternately connected with the first and second transmission subsets 660, 661 (i.e. through the clutch 662 to the rotating synchronizers 666, 667 and through the clutch 663 to the ring gear member 644). The planet carrier assembly member 626 is continuously connected with the ring gear member 634 through the interconnecting member 674. The planet carrier assembly member 646 is continuously connected with the ring gear member 624 and the output shaft 19 through the interconnecting member 676. The sun gear member 642 is continuously connected with the sun gear member 652 through the interconnecting member 678.

The planet carrier assembly member 626 is selectively connectable with the transmission housing 680 through the braking synchronizer 664. The sun gear member 622 is selectively connectable with the transmission housing 680 through the braking synchronizer 665. The sun gear member 632 is selectively connectable with the input shaft 17 through the input clutch 662 and the rotating synchronizer 666. The planet carrier assembly member 636 is selectively connectable with the input shaft 17 through the input clutch 662 and the rotating synchronizer 667. The sun gear member 622 is selectively connectable with the sun gear member 632 through the rotating synchronizer 668. The ring gear member 654 is selectively connectable with the transmission housing 680 through the braking synchronizer 669. The planet carrier assembly member 656 is selectively connectable with the transmission housing 680 through the braking synchronizer 670. The planet carrier assembly member 646 is selectively connectable with the ring gear member 654 through the rotating synchronizer 671. The planet carrier assembly member 646 is selectively connectable with the planet carrier assembly member 656 through the rotating synchronizer 672.

As shown in FIG. 7b, and in particular the truth table disclosed therein, the input clutches and torque transmitting mechanisms are selectively engaged in combinations of at least three to provide six forward speed ratios and a reverse speed ratio. The ratio values given are by way example and are established utilizing the ring gear/sun gear tooth ratios given in FIG. 7b. For example, the R1/S2 value is the tooth ratio of the planetary gear set 620; the R2/S2 value is the tooth ratio of the planetary gear set 630; the R3/S3 value is the tooth ratio of the planetary gear set 640; and the R4/S4 value is the tooth ratio of the planetary gear set 650. The ratio steps between adjacent forward ratios and the reverse to first ratio are also given in FIG. 7b.

Those skilled in the art will, upon reviewing the truth table of FIG. 7b, recognize that the numerical values of the reverse and fifth forward speed ratios are determined utilizing the ring gear/sun gear tooth ratio of the planetary gear set 620. The numerical values of the first and third forward speed ratios are determined utilizing the ring gear/sun gear tooth ratios of the planetary gear sets 620, 630. The numerical value of the second forward speed ratio is determined utilizing the ring gear/sun gear tooth ratios of the planetary gear sets 640, 650. The numerical value of the fourth forward speed ratio is 1. The numerical value of the sixth forward speed ratio is determined utilizing the ring gear/sun gear tooth ratio of the planetary gear set 640.

Figures 8A, 8B:
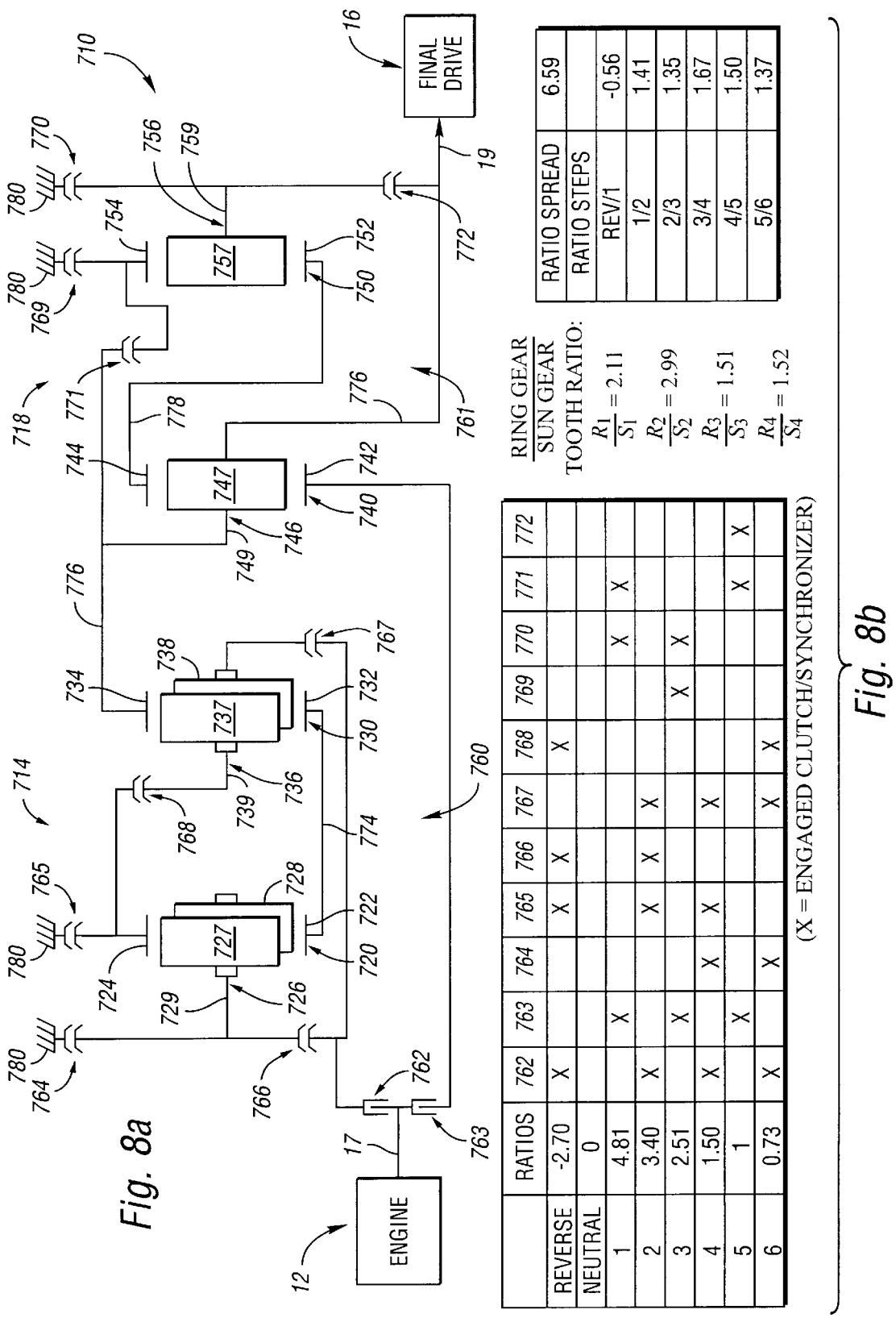

A powertrain 710, shown in FIG. 8a, has the conventional engine 12, a planetary transmission 714, and the conventional final drive mechanism 16. The engine 12 is continuously connected with the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, a third planetary gear set 740, and a fourth planetary gear set 750.

The planetary gear set 720 includes a sun gear member 722, a ring gear member 724, and a planet carrier assembly member 726. The planet carrier assembly member 726 includes a plurality of intermeshing pinion gears 727, 728 rotatably mounted on a carrier member 729 and disposed in meshing relationship with the ring gear member 724 and the sun gear member 722, respectively.

The planetary gear set 730 includes a sun gear member 732, a ring gear member 734, and a planet carrier assembly member 736. The planet carrier assembly member 736 includes a plurality of intermeshing pinion gears 737, 738 rotatably mounted on a carrier member 739 and disposed in meshing relationship with the ring gear member 734 and the sun gear member 732, respectively.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear set 750 includes a sun gear member 752, a ring gear member 754, and a planet carrier assembly member 756. The planet carrier assembly member 756 includes a plurality of pinion gears 757 rotatably mounted on a carrier member 759 and disposed in meshing relationship with both the sun gear member 752 and the ring gear member 754.

As a result of the dual clutch arrangement of the invention, the four planetary gear sets 720, 730, 740 and 750 are divided into first and second transmission subsets 760, 761 which are alternatively engaged to provide odd number and even number speed ranges, respectively. Transmission subset 760 includes planetary gear sets 720 and 730, and transmission subset 761 includes planetary gear sets 740 and 750. The output shaft 19 is continuously connected with members of both subsets 760 and 761.

As mentioned above, the first and second input clutches 762, 763 are alternatively engaged for transmitting power from the input shaft 17 to transmission subset 760 or transmission subset 761. The first and second input clutches 762, 763 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 760, 761 prior to engaging the respective input clutches 762, 763. The preselection is achieved by means of electronically controlled synchronizers. As shown, the planetary gear arrangement includes nine torque transmitting mechanisms 764, 765, 766, 767, 768, 769, 770, 771 and 772. The torque transmitting mechanisms 764, 765, 769 and 770 comprise braking synchronizers, and the torque transmitting mechanisms 766, 767, 768, 771 and 772 comprise rotating synchronizers.

Accordingly, the input shaft 17 is alternately connected with the first and second transmission subsets 760, 761 (i.e. through the clutch 762 to the rotating synchronizers 766, 767 and through the clutch 763 to the sun gear member 742). The sun gear member 722 is continuously connected with the sun gear member 732 through the interconnecting member 774. The planet carrier assembly member 746 is continuously connected with the ring gear member 734 and the output shaft 19 through the interconnecting member 776. The ring gear member 744 is continuously connected with the sun gear member 752 through the interconnecting member 778.

The planet carrier assembly member 726 is selectively connectable with the transmission housing 780 through the braking synchronizer 764. The ring gear member 724 is selectively connectable with the transmission housing 780 through the braking synchronizer 765. The planet carrier assembly member 726 is selectively connectable with the input shaft 17 through the input clutch 762 and the rotating synchronizer 766. The planet carrier assembly member 736 is selectively connectable with the input shaft 17 through the input clutch 762 and the rotating synchronizer 767. The ring gear member 724 is selectively connectable with the planet carrier assembly member 736 through the rotating synchronizer 768. The ring gear member 754 is selectively connectable with the transmission housing 780 through the braking synchronizer 769. The planet carrier assembly member 756 is selectively connectable with the transmission housing 780 through the braking synchronizer 770. The planet carrier assembly member 746 is selectively connectable with the ring gear member 754 through the rotating synchronizer 771. The planet carrier assembly member 746 is selectively connectable with the planet carrier assembly member 756 through the rotating synchronizer 772.

As shown in FIG. 8b, and in particular the truth table disclosed therein, the input clutches and torque transmitting mechanisms are selectively engaged in combinations of at least three to provide six forward speed ratios and a reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; the R3/S3 value is the tooth ratio of the planetary gear set 740; and the R4/S4 value is the tooth ratio of the planetary gear set 750.

FIG. 8b also provides a chart of the ratio steps between adjacent forward ratios and between the reverse and first forward ratio. For example, the ratio step between the first and second forward ratios is 1.41.

Those skilled in the art will recognize that the numerical values of the reverse, second and sixth forward speed ratios are determined utilizing the ring gear/sun gear tooth ratios of the planetary gear sets 720, 730. The numerical value of the first forward speed ratio is determined utilizing the ring gear/sun gear tooth ratios of the planetary gear sets 740, 750. The numerical value of the third forward speed ratio is determined utilizing the ring gear/sun gear tooth ratio of the planetary gear set 740. The numerical value of the fourth forward speed ratio is determined utilizing the ring gear/sun gear tooth ratio of the planetary gear set 730. The numerical value of the fifth forward speed ratio is 1.

A powertrain 810, shown in FIG. 9a, has the conventional engine 12, a planetary transmission 814, and the final drive mechanism 16. The engine 12 is continuously connected with the input shaft 17. The planetary transmission 814 is drivingly connected with final drive mechanism 16 through output shaft 19. The planetary transmission 814 includes a planetary gear arrangement 818 that has a first planetary gear set 820, a second planetary gear set 830, a third planetary gear set 840, and fourth planetary gear set 850.

The planetary gear set 820 includes a sun gear member 822, a ring gear member 824, and a planet carrier assembly member 826. The planet carrier assembly member 826 includes a plurality of intermeshing pinion gears 827, 828 rotatably mounted on a carrier member 829 and disposed in meshing relationship with the ring gear member 824 and the sun gear member 822, respectively.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the sun gear member 842 and the ring gear member 844.

The planetary gear set 850 includes a sun gear member 852, a ring gear member 854, and a planet carrier assembly member 856. The planet carrier assembly member 856 includes a plurality of intermeshing pinion gears 857, 858 rotatably mounted on a carrier member 859 and disposed in meshing relationship with the ring gear member 854 and the sun gear member 852, respectively.

As a result of the dual clutch arrangement of the invention, the four planetary gear sets 820, 830, 840 and 850 are divided into first and second transmission subsets 860, 861 which are alternatively engaged to provide odd number and even number speed ranges, respectively. Transmission subset 860 includes planetary gear sets 820 and 830, and transmission subset 861 includes planetary gear sets 840 and 850. The output shaft 19 is continuously connected with members of both subsets 860 and 861.

As mentioned above, the first and second input clutches 862, 863 are alternatively engaged for transmitting power from the input shaft 17 to transmission subset 860 or transmission subset 861. The first and second input clutches 862, 863 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratio selection is preselected within the transmission subsets 860, 861 prior to engaging the respective input clutches 862, 863. The preselection is achieved by means of electronically controlled synchronizers. As shown, the planetary gear arrangement includes nine torque transmitting mechanisms 864, 865, 866, 867, 868, 869, 870, 871 and 872. The torque transmitting mechanisms 864, 865, 869 and 870 comprise braking synchronizers, and the torque transmitting mechanisms 866, 867, 868, 871 and 872 comprise rotating synchronizers.

Accordingly, the input shaft 17 is alternately connected with the first and second transmission subsets 860, 861 (i.e. through the clutch 862 to the rotating synchronizers 866, 867 and through the clutch 863 to the sun gear member 842). The sun gear member 822 is continuously connected with the sun gear member 832 through the interconnecting member 874. The planet carrier assembly member 846 is continuously connected with the ring gear member 834 and the output shaft 19 through the interconnecting member 876. The ring gear member 844 is continuously connected with the ring gear member 854 through the interconnecting member 878.

The planet carrier assembly member 826 is selectively connectable with the transmission housing 880 through the braking synchronizer 864. The ring gear member 824 is selectively connectable with the transmission housing 880 through the braking synchronizer 865. The sun gear member 822 is selectively connectable with the input shaft 17 through the input clutch 862 and the rotating synchronizer 866. The planet carrier assembly member 836 is selectively connectable with the input shaft 17 through the input clutch 862 and the rotating synchronizer 867. The ring gear member 824 is selectively connectable with the planet carrier assembly member 836 through the rotating synchronizer 868. The planet carrier assembly member 856 is selectively connectable with the transmission housing 880 through the braking synchronizer 869. The sun gear member 852 is selectively connectable with the transmission housing 880 through the braking synchronizer 870. The planet carrier assembly member 846 is selectively connectable with the planet carrier assembly member 856 through the rotating synchronizer 871. The planet carrier assembly member 846 is selectively connectable with the sun gear member 852 through the rotating synchronizer 872.

As shown in FIG. 9b, and in particular the truth table disclosed therein, the input clutches and torque transmitting mechanisms are selectively engaged in combinations of at least three to provide six forward speed ratios and a reverse speed ratio. A sample of numerical values for the individual ratios is also given in the truth table of FIG. 9b. These numerical values have been calculated using the ring gear/sun gear tooth ratios also given by way of example in FIG. 9b. The R1/S1 value is the tooth ratio of the planetary gear set 820; the R2/S2 value is the tooth ratio of planetary gear set 830; the R3/S3 value is the tooth ratio of the planetary gear set 840; and the R4/S4 value is the tooth ratio of the planetary gear set 850. FIG. 9b also describes the ratio steps between adjacent forward ratios and between the reverse and first forward ratio. For example, the ratio step between the first and second forward ratios is 1.46.

Those skilled in the art will recognize that the numerical values of the reverse and sixth forward speed ratios are determined utilizing the ring gear/sun gear tooth ratio of the planetary gear set 830. The numerical value of the first forward speed ratio is determined utilizing the ring gear/sun gear tooth ratio of the planetary gear set 840. The numerical values of the second and fourth forward speed ratios are determined utilizing the ring gear/sun gear tooth ratios of the planetary gear sets 820, 830. The numerical value of the third forward speed ratio is determined utilizing the ring gear/sun gear tooth ratios of the planetary gear sets 840, 850. The numerical value of the fifth forward speed ratio is 1.

Referring to FIG. 10a, a powertrain 910 is shown having a conventional engine 12, a planetary transmission 914, and a conventional final drive mechanism 16. The planetary transmission 914 includes an input shaft 17 connected with the engine 12, a planetary gear arrangement 918, and an output shaft 19 continuously connected with the final drive mechanism 16. The planetary gear arrangement 918 includes four planetary gear sets 920, 930, 940 and 950.

The planetary gear set 920 includes a sun gear member 922, a ring gear member 924, and a planet carrier assembly member 926. The planet carrier assembly member 926 includes a plurality of intermeshing pinion gears 927, 928 rotatably mounted on a carrier member 929 and disposed in meshing relationship with the ring gear member 924 and the sun gear member 922, respectively.

The planetary gear set 930 includes a sun gear member 932, a ring gear member 934, and a planet carrier assembly member 936. The planet carrier assembly member 936 includes a plurality of pinion gears 937 rotatably mounted on a carrier member 939 and disposed in meshing relationship with both the sun gear member 932 and the ring gear member 934.

The planetary gear set 940 includes a sun gear member 942, a ring gear member 944, and a planet carrier assembly member 946. The planet carrier assembly member 946 includes a plurality of intermeshing pinion gears 947, 948 rotatably mounted on a carrier member 949 and disposed in meshing relationship with the ring gear member 944 and the sun gear member 942, respectively.

The planetary gear set 950 includes a sun gear member 952, a ring gear member 954, and a planet carrier assembly member 956. The planet carrier assembly member 956 includes a plurality of pinion gears 957 rotatably mounted on a carrier member 959 and disposed in meshing relationship with both the sun gear member 952 and the ring gear member 954.

As a result of the dual clutch arrangement of the invention, the four planetary gear sets 920, 930, 940 and 950 are divided into first and second transmission subsets 960, 961 which are alternatively engaged to provide odd number and even number speed ranges, respectively. Transmission subset 960 includes planetary gear sets 920 and 930, and transmission subset 961 includes planetary gear sets 940 and 950. The output shaft 19 is continuously connected with members of both subsets 960 and 961.

As mentioned above, the first and second input clutches 962, 963 are alternatively engaged for transmitting power from the input shaft 17 to transmission subset 960 or transmission subset 961. The first and second input clutches 962, 963 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 960, 961 prior to engaging the respective input clutches 962, 963. The preselection is achieved by means of electronically controlled synchronizers. As shown, the planetary gear arrangement includes nine torque transmitting mechanisms 964, 965, 966, 967, 968, 969, 970, 971 and 972. The torque transmitting mechanisms 964, 965, 969 and 970 comprise braking synchronizers, and the torque transmitting mechanisms 966, 967, 968, 971 and 972 comprise rotating synchronizers.

Accordingly, the input shaft 17 is alternately connected with the first and second transmission subsets 960, 961 (i.e. through the clutch 962 to the rotating synchronizers 966, 967 and through the clutch 963 to the ring gear member 944). The sun gear member 922 is continuously connected with the sun gear member 932 through the interconnecting member 974. The planet carrier assembly member 946 is continuously connected with the ring gear member 934 and the output shaft 19 through the interconnecting member 976. The sun gear member 942 is continuously connected with the sun gear member 952 through the interconnecting member 978.

The planet carrier assembly member 926 is selectively connectable with the transmission housing 980 through the braking synchronizer 964. The ring gear member 924 is selectively connectable with the transmission housing 980 through the braking synchronizer 965. The sun gear member 922 is selectively connectable with the input shaft 17 through the input clutch 962 and the rotating synchronizer 966. The planet carrier assembly member 936 is selectively connectable with the input shaft 17 through the input clutch 962 and the rotating synchronizer 967. The ring gear member 924 is selectively connectable with the planet carrier assembly member 936 through the rotating synchronizer 968. The ring gear member 954 is selectively connectable with the transmission housing 980 through the braking synchronizer 969. The planet carrier assembly member 956 is selectively connectable with the transmission housing 980 through the braking synchronizer 970. The planet carrier assembly member 946 is selectively connectable with the ring gear member 954 through the rotating synchronizer 971. The planet carrier assembly member 946 is selectively connectable with the planet carrier assembly member 956 through the rotating synchronizer 972.

As shown in FIG. 10b, and in particular the truth table disclosed therein, the input clutches and torque transmitting mechanisms are selectively engaged in combinations of at least three to provide six forward speed ratios and a reverse speed ratio. The truth table also provides a set of examples for the numerical values for each of the reverse and forward speed ratios. These numerical values have been determined utilizing the ring gear/sun gear tooth ratios given in FIG. 10b. The R1/S1 value is the tooth ratio of the planetary gear set 920; the R2/S2 value is the tooth ratio of the planetary gear set 930; the R3/S3 value is the tooth ratio of the planetary gear set 940; and the R4/S4 value is the tooth ratio of the planetary gear set 950.

Those skilled in the art, upon reviewing the engagement combinations, will recognize that the numerical values of the reverse and fifth forward speed ratios are determined utilizing the ring gear/sun gear tooth ratio of the planetary gear set 930. The numerical values of the first and third forward speed ratios are determined utilizing the ring gear/sun gear tooth ratios of the planetary gear sets 920, 930. The numerical value of the second forward speed ratio is determined utilizing the ring gear/sun gear tooth ratios of the planetary gear sets 940, 950. The numerical value of the fourth forward speed ratio is 1. The numerical value of the sixth forward speed ratio is determined utilizing the ring gear/sun gear tooth ratio of the planetary gear set 940.

Referring to FIG. 11a, a powertrain 1010 is shown having a conventional engine 12, a planetary transmission 1014, and a conventional final drive mechanism 16. The planetary transmission 1014 includes an input shaft 17 connected with the engine 12, a planetary gear arrangement 1018, and an output shaft 19 continuously connected with the final drive mechanism 16. The planetary gear arrangement 1018 includes four planetary gear sets 1020, 1030, 1040 and 1050.

The planetary gear set 1020 includes a sun gear member 1022, a ring gear member 1024, and a planet carrier assembly member 1026. The planet carrier assembly member 1026 includes a plurality of intermeshing pinion gears 1027, 1028 rotatably mounted on a carrier member 1029 and disposed in meshing relationship with the ring gear member 1024 and the sun gear member 1022, respectively.

The planetary gear set 1030 includes a sun gear member 1032, a ring gear member 1034, and a planet carrier assembly member 1036. The planet carrier assembly member 1036 includes a plurality of intermeshing pinion gears 1037, 1038 rotatably mounted on a carrier member 1039 and disposed in meshing relationship with the ring gear member 1034 and the sun gear member 1032, respectively.

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the sun gear member 1042 and the ring gear member 1044.

The planetary gear set 1050 includes a sun gear member 1052, a ring gear member 1054, and a planet carrier assembly member 1056. The planet carrier assembly member 1056 includes a plurality of intermeshing pinion gears 1057, 1058 rotatably mounted on a carrier member 1059 and disposed in meshing relationship with the ring gear member 1054 and the sun gear member 1052, respectively.

As a result of the dual clutch arrangement of the invention, the four planetary gear sets 1020, 1030, 1040 and 1050 are divided into first and second transmission subsets 1060, 1061 which are alternatively engaged to provide odd number and even number speed ranges, respectively. Transmission subset 1060 includes planetary gear sets 1020 and 1030, and transmission subset 1061 includes planetary gear sets 1040 and 1050. The output shaft 19 is continuously connected with members of both subsets 1060 and 1061.

As mentioned above, the first and second input clutches 1062, 1063 are alternatively engaged for transmitting power from the input shaft 17 to transmission subset 1060 or transmission subset 1061. The first and second input clutches 1062, 1063 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 1060, 1061 prior to engaging the respective input clutches 1062, 1063. The preselection is achieved by means of electronically controlled synchronizers. As shown, the planetary gear arrangement includes nine torque transmitting mechanisms 1064, 1065, 1066, 1067, 1068, 1069, 1070, 1071 and 1072. The torque transmitting mechanisms 1064, 1065, 1069 and 1070 comprise braking synchronizers, and the torque transmitting mechanisms 1066, 1067, 1068, 1071 and 1072 comprise rotating synchronizers.

Accordingly, the input shaft 17 is alternately connected with the first and second transmission subset 1060, 1061 (i.e. through the clutch 1062 to the rotating synchronizers 1066, 1067 and through the clutch 1063 to the ring gear member 1044). The sun gear member 1022 is continuously connected with the sun gear member 1032 through the interconnecting member 1074. The planet carrier assembly member 1046 is continuously connected with the ring gear member 1034 and the output shaft 19 through the interconnecting member 1076. The sun gear member 1042 is continuously connected with the planet carrier assembly member 1056 through the interconnecting member 1078.

The planet carrier assembly member 1026 is selectively connectable with the transmission housing 1080 through the braking synchronizer 1064. The ring gear member 1024 is selectively connectable with the transmission housing 1080 through the braking synchronizer 1065. The planet carrier assembly member 1026 is selectively connectable with the input shaft 17 through the input clutch 1062 and the rotating synchronizer 1066. The planet carrier assembly member 1036 is selectively connectable with the input shaft 17 through the input clutch 1062 and the rotating synchronizer 1067. The ring gear member 1024 is selectively connectable with the planet carrier assembly member 1036 through the rotating synchronizer 1068. The ring gear member 1054 is selectively connectable with the transmission housing 1080 through the braking synchronizer 1069. The sun gear member 1052 is selectively connectable with the transmission housing 1080 through the braking synchronizer 1070. The planet carrier assembly member 1046 is selectively connectable with the ring gear member 1054 through the rotating synchronizer 1071. The planet carrier assembly member 1046 is selectively connectable with the sun gear member 1052 through the rotating synchronizer 1072.

As shown in FIG. 11b, and in particular the truth table disclosed therein, the input clutches and torque transmitting mechanisms are selectively engaged in combinations of at least three to provide six forward speed ratios and a reverse speed ratio. The truth table also provides a set of examples for the numerical values for each of the reverse and forward speed ratios. These numerical values have been determined utilizing the ring gear/sun gear tooth ratios given in FIG. 11b. The R1/S1 value is the tooth ratio of the planetary gear set 1020; the R2/S2 value is the tooth ratio of the planetary gear set 1030; the R3/S3 value is the tooth ratio of the planetary gear set 1040; and the R4/S4 value is the tooth ratio of the planetary gear set 1050.

Those skilled in the art, upon reviewing the engagement combinations, will recognize that the numerical values of the reverse, first and fifth forward speed ratios are determined utilizing the ring gear/sun gear tooth ratios of the planetary gear sets 1020, 1030. The numerical values of the second and sixth forward speed ratios are determined utilizing the ring gear/sun gear tooth ratios of the planetary gear sets 1040, 1050. The numerical value of the third forward speed ratio is determined utilizing the ring gear/sun gear tooth ratio of the planetary gear set 1030. The numerical value of the fourth forward speed ratio is 1.

Figures 12A, 12B:
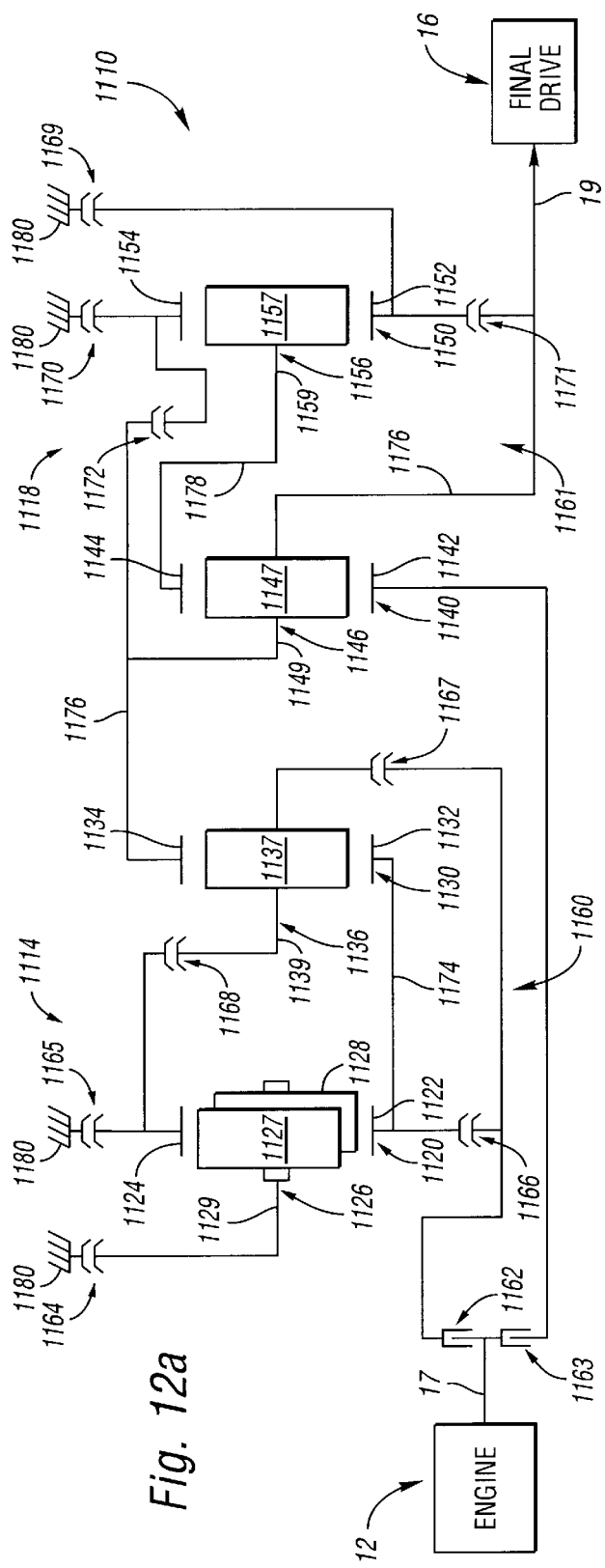

FIG. 12a shows a powertrain 1110 having a conventional engine 12, a planetary transmission 1114, and a conventional final drive mechanism 16. The planetary transmission 1114 includes an input shaft 17 connected with the engine 12, a planetary gear arrangement 1118, and an output shaft 19 connected with the final drive mechanism 16. The planetary gear arrangement 118 includes four planetary gear sets 1120, 1130, 1140 and 1150.

The planetary gear set 1120 includes a sun gear member 1122, a ring gear member 1124, and a planet carrier assembly member 1126. The planet carrier assembly member 1126 includes a plurality of intermeshing pinion gears 1127, 1128 rotatably mounted on a carrier member 1129 and disposed in meshing relationship with the ring gear member 1124 and the sun gear member 1122, respectively.

The planetary gear set 1130 includes a sun gear member 1132, a ring gear member 1134, and a planet carrier assembly member 1136. The planet carrier assembly member 1136 includes a plurality of pinion gears 1137 rotatably mounted on a carrier member 1139 and disposed in meshing relationship with both the sun gear member 1132 and the ring gear member 1134.

The planetary gear set 1140 includes a sun gear member 1142, a ring gear member 1144, and a planet carrier assembly member 1146. The planet carrier assembly member 1146 includes a plurality of pinion gears 1147 rotatably mounted on a carrier member 1149 and disposed in meshing relationship with both the sun gear member 1142 and the ring gear member 1144.

The planetary gear set 1150 includes a sun gear member 1152, a ring gear member 1154, and a planet carrier assembly member 1156. The planet carrier assembly member 1156 includes a plurality of pinion gears 1157 rotatably mounted on a carrier member 1159 and disposed in meshing relationship with both the sun gear member 1152 and the ring gear member 1154.

As a result of the dual clutch arrangement of the invention, the four planetary gear sets 1120, 1130, 1140 and 1150 are divided into first and second transmission subsets 1160, 1161 which are alternatively engaged to provide odd number and even number speed ranges, respectively. Transmission subset 1160 includes planetary gear sets 1120 and 1130, and transmission subset 1161 includes planetary gear sets 1140 and 1150. The output shaft 19 is continuously connected with members of both subsets 1160 and 1161.

As mentioned above, the first and second input clutches 1162, 1163 are alternatively engaged for transmitting power from the input shaft 17 to transmission subset 1160 or transmission subset 1161. The first and second input clutches 1162, 1163 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 1160, 1161 prior to engaging the respective input clutches 1162, 1163. The preselection is achieved by means of electronically controlled synchronizers. As shown, the planetary gear arrangement includes nine torque transmitting mechanisms 1164, 1165, 1166, 1167, 1168, 1169, 1170, 1171 and 1172. The torque transmitting mechanisms 1164, 1165, 1169 and 1170 comprise braking synchronizers, and the torque transmitting mechanisms 1166, 1167, 1168, 1171 and 1172 comprise rotating synchronizers.

Accordingly, the input shaft 17 is alternately connected with the first and second transmission subsets 1160, 1161 (i.e. through the clutch 1162 to the rotating synchronizers 1166, 1167 and through the clutch 1163 to the sun gear member 1142). The sun gear member 1122 is continuously connected with the sun gear member 1132 through the interconnecting member 1174. The planet carrier assembly member 1146 is continuously connected with the ring gear member 1134 and the output shaft 19 through the interconnecting member 1176. The ring gear member 1144 is continuously connected with the planet carrier assembly member 1156 through the interconnecting member 1178.

The planet carrier assembly member 1126 is selectively connectable with the transmission housing 1180 through the braking synchronizer 1164. The ring gear member 1124 is selectively connectable with the transmission housing 1180 through the braking synchronizer 1165.

The sun gear member 1122 is selectively connectable with the input shaft 17 through the input clutch 1162 and the rotating synchronizer 1166. The planet carrier assembly member 1136 is selectively connectable with the input shaft 17 through the input clutch 1162 and the rotating synchronizer 1167. The ring gear member 1124 is selectively connectable with the planet carrier assembly member 1136 through the rotating synchronizer 1168. The sun gear member 1152 is selectively connectable with the transmission housing 1180 through the braking synchronizer 1169. The ring gear member 1154 is selectively connectable with the transmission housing 1180 through the braking synchronizer 1170. The planet carrier assembly member 1146 is selectively connectable with the sun gear member 1152 through the rotating synchronizer 1171. The planet carrier assembly member 1146 is selectively connectable with the ring gear member 1154 through the rotating synchronizer 1172.

As shown in FIG. 12*b*, and in particular the truth table disclosed therein, the input clutches and torque transmitting mechanisms are selectively engaged in combinations of at least three to provide six forward speed ratios and a reverse speed ratio.

Those skilled in the art will recognize that the numerical values of the reverse and sixth forward speed ratios are determined utilizing the ring gear/sun gear tooth ratio of the planetary gear set 1130. The numerical value of the first forward speed ratio is determined utilizing the ring gear/sun gear tooth ratio of the planetary gear set 1140. The numerical values of the second and fourth forward speed ratios are determined utilizing the ring gear/sun gear tooth ratios of the planetary gear sets 1120, 1130. The numerical value of the third forward speed ratio is determined utilizing the ring gear/sun gear tooth ratios of the planetary gear sets 1140, 1150. The numerical value of the fifth forward speed ratio is 1.

As set forth above, the truth table of FIG. 12*b* describes the engagement sequence of the torque transmitting mechanisms utilized to provide a reverse drive ratio and six forward speed ratios. The truth table also provides an example of the ratios that can be attained with the family members shown in FIG. 12*a* utilizing the sample tooth ratios given in FIG. 12*b*. The R1/S1 value is the tooth ratio of the planetary gear set 1120; the R2/S2 value is the tooth ratio of the planetary gear set 1130; the R3/S3 value is the tooth ratio of the planetary gear set 1140; and the R4/S4 value is the tooth ratio of the planetary gear set 1150. Also shown in FIG. 12*b* are the ratio steps between single step ratios in the forward direction as well as the reverse to first ratio step. For example, the first to second step ratio is 1.60.

Turning the FIG. 13*a*, a powertrain 1210 having a conventional engine 12, a planetary transmission 1214, and conventional final drive mechanism 16 is shown.

The planetary transmission 1214 includes an input shaft 17 continuously connected with the engine 12, a planetary gear arrangement 1218, and an output shaft 19 continuously connected with the final drive mechanism 16. The planetary gear arrangement 1218 includes four planetary gear sets 1220, 1230, 1240 and 1250.

The planetary gear set 1220 includes a sun gear member 1222, a ring gear member 1224, and a planet carrier assembly member 1226. The planet carrier assembly member 1226 includes a plurality of intermeshing pinion gears 1227, 1228 rotatably mounted on a carrier member 1229 and disposed in meshing relationship with the ring gear member 1224 and the sun gear member 1222, respectively.

The planetary gear set 1230 includes a sun gear member 1232, a ring gear member 1234, and a planet carrier assembly member 1236. The planet carrier assembly member 1236 includes a plurality of pinion gears 1237 rotatably mounted on a carrier member 1239 and disposed in meshing relationship with both the sun gear member 1232 and the ring gear member 1234.

The planetary gear set 1240 includes a sun gear member 1242, a ring gear member 1244, and a planet carrier assembly member 1246. The planet carrier assembly member 1246 includes a plurality of pinion gears 1247 rotatably mounted on a carrier member 1249 and disposed in meshing relationship with both the sun gear member 1242 and the ring gear member 1244.

The planetary gear set 1250 includes a sun gear member 1252, a ring gear member 1254, and a planet carrier assembly member 1256. The planet carrier assembly member 1256 includes a plurality of pinion gears 1257 rotatably mounted on a carrier member 1259 and disposed in meshing relationship with both the sun gear member 1252 and the ring gear member 1254.

As a result of the dual clutch arrangement of the invention, the four planetary gear sets 1220, 1230, 1240 and 1250 are divided into first and second transmission subsets 1260, 1261 which are alternatively engaged to provide odd number and even number speed ranges, respectively. Transmission subset 1260 includes planetary gear sets 1220 and 1230, and transmission subset 1261 includes planetary gear sets 1240 and 1250. The output shaft 19 is continuously connected with members of both subsets 1260 and 1261.

In this family member, rather than having two input clutches alternatively engaged for transmitting power from the input shaft 17 to transmission subset 1260 or 1261, the first input clutch is operatively replaced by the first and second input clutches 1266, 1267. The first and second input clutches 1266, 1267 and third input clutch 1263 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 1260, 1261 prior to engaging the respective input clutch 1263, 1266, 1267. The preselection is achieved by means of electronically controlled synchronizers. As shown, the planetary gear arrangement includes seven torque transmitting mechanisms 1264, 1265, 1268, 1269, 1270, 1271 and 1272. The torque transmitting mechanisms 1264, 1265, 1269 and 1270 comprise braking synchronizers, and the torque transmitting mechanisms 1268, 1271 and 1272 comprise rotating synchronizers.

Accordingly, the input shaft 17 is alternately connected with the first and second transmission subsets 1260, 1261 (i.e. through the clutch 1266 to sun gear member 1222 or through the clutch 1267 to the planet carrier assembly member 1236 and through the clutch 1263 to the sun gear member 1242). The sun gear member 1222 is continuously connected with the sun gear member 1232 through the interconnecting member 1274. The planet carrier assembly member 1246 is continuously connected with the ring gear member 1234 and the output shaft 19 through the interconnecting member 1276. The ring gear member 1244 is continuously connected with the planet carrier assembly member 1256 through the interconnecting member 1278.

The planet carrier assembly member 1226 is selectively connectable with the transmission housing 1280 through the braking synchronizer 1264. The ring gear member 1224 is selectively connectable with the transmission housing 1280 through the braking synchronizer 1265. The sun gear member 1222 is selectively connectable with the input shaft 17 through the input clutch 1266. The planet carrier assembly member 1236 is selectively connectable with the input shaft 17 through the input clutch 1267. The ring gear member 1224 is selectively connectable with the planet carrier assembly member 1236 through the rotating synchronizer 1268. The sun gear member 1252 is selectively connectable with the transmission housing 1280 through the braking synchronizer 1269. The ring gear member 1254 is selectively connectable with the transmission housing 1280 through the braking synchronizer 1270. The planet carrier assembly member 1246 is selectively connectable with the sun gear member 1252 through the rotating synchronizer 1271. The planet carrier assembly member 1246 is selectively connectable with the ring gear member 1254 through the rotating synchronizer 1272.

As shown in FIG. 13b, and in particular the truth table disclosed therein, the input clutches and torque transmitting mechanisms are selectively engaged in combinations of three to provide six forward speed ratios and a reverse speed ratio.

Those skilled in the art will recognize that the numerical values of the reverse and sixth forward speed ratios are determined utilizing the ring gear/sun gear tooth ratio of the planetary gear set 1230. The numerical value of the first forward speed ratio is determined utilizing the ring gear/sun gear tooth ratio of the planetary gear set 1240. The numerical values of the second and fourth forward speed ratios are determined utilizing the ring gear/sun gear tooth ratios of the planetary gear sets 1220, 1230. The numerical value of the third forward speed ratio is determined utilizing the ring gear/sun gear tooth ratios of the planetary gear sets 1240, 1250. The numerical value of the fifth forward speed ratio is 1.

As previously set forth, the truth table of FIG. 13b describes the combinations of engagements utilized for six forward speed ratios and one reverse speed ratio. The truth table also provides an example of speed ratios that are available with the family member described above. These examples of speed ratios are determined the tooth ratios given in FIG. 13b. The R1/S1 value is the tooth ratio of the planetary gear set 1220; the R2/S2 value is the tooth ratio of the planetary gear set 1230; the R3/S3 value is the tooth ratio of the planetary gear set 1240; and the R4/S4 value is the tooth ratio of the planetary gear set 1250. Also depicted in FIG. 13b is a chart representing the ratio steps between adjacent forward speed ratios and the reverse speed ratio. For example, the first to second ratio interchange has a step of 1.60.

FIGS. 14a and 14b illustrate a transmission wherein one of the torque transmitting mechanisms from a previously described configuration is eliminated to realize five forward speed ratios and a reverse speed ratio. Specifically, the powertrain 1310, shown in FIG. 14a is identical to that shown in FIG. 2a, except that the braking synchronizer 170 of FIG. 2a has been eliminated.

A powertrain 1310, shown in FIG. 14a, includes the engine 12, a planetary transmission 1314, and the final drive mechanism 16. The planetary transmission 1314 includes an input shaft 17 continuously connected with the engine 12, a planetary gear arrangement 1318, and an output shaft 19 continuously connected with the final drive mechanism 16. The planetary gear arrangement 1318 includes four planetary gear sets 1320, 1330, 1340 and 1350.

The planetary gear set 1320 includes a sun gear member 1322, a ring gear member 1324, and a planet carrier assembly member 1326. The planet carrier assembly member 1326 includes a plurality of intermeshing pinion gears 1327, 1328 rotatably mounted on a carrier member 1329 and disposed in meshing relationship with the ring gear member 1324 and the sun gear member 1322, respectively.

The planetary gear set 1330 includes a sun gear member 1332, a ring gear member 1334, and a planet carrier assembly member 1336. The planet carrier assembly member 1336 includes a plurality of intermeshing pinion gears 1337, 1338 rotatably mounted on a carrier member 1339 and disposed in meshing relationship with the ring gear member 1334 and the sun gear member 1332, respectively.

The planetary gear set 1340 includes a sun gear member 1342, a ring gear member 1344, and a planet carrier assembly member 1346. The planet carrier assembly member 1346 includes a plurality of intermeshing pinion gears 1347, 1348 rotatably mounted on a carrier member 1349 and disposed in meshing relationship with the ring gear member 1344 and the sun gear member 1342, respectively.

The planetary gear set 1350 includes a sun gear member 1352, a ring gear member 1354, and a planet carrier assembly member 1356. The planet carrier assembly member 1356 includes a plurality of pinion gears 1357 rotatably mounted on a carrier member 1359 and disposed in meshing relationship with both the sun gear member 1352 and the ring gear member 1354.

As a result of the dual clutch arrangement of the invention, the four planetary gear sets 1320, 1330, 1340 and 1350 are divided into first and second transmission subsets 1360, 1361 which are alternatively engaged to provide odd number and even number speed ranges, respectively. Transmission subset 1360 includes planetary gear sets 1320 and 1330, and transmission subset 1361 includes planetary gear sets 1340 and 1350. The output shaft 19 is continuously connected with members of both subsets 1360 and 1361.

As mentioned above, the first and second input clutches 1362, 1363 are alternatively engaged for transmitting power from the input shaft 17 to transmission subset 1360 or transmission subset 1361. The first and second input clutches 1362, 1363 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 1360, 1361 prior to engaging the respective input clutches 1362, 1363. The preselection is achieved by means of electronically controlled synchronizers. As shown, the planetary gear arrangement includes eight torque transmitting mechanisms 1364, 1365, 1366, 1367, 1368, 1369, 1371 and 1372. The torque transmitting mechanisms 1364, 1365 and 1369 comprise braking synchronizers, and the torque transmitting mechanisms 1366, 1367, 1368, 1371 and 1372 comprise rotating synchronizers.

Accordingly, the input shaft 17 is alternately connected with the first and second transmission subsets 1360, 1361 (i.e. through the clutch 1362 to the rotating synchronizers 1366, 1367 and through the clutch 1363 to the ring gear member 1344). The ring gear member 1322 is continuously connected with the ring gear member 1332 through the interconnecting member 1374. The planet carrier assembly member 1346 is continuously connected with the ring gear member 1334 and the output shaft 19 through the interconnecting member 1376. The sun gear member 1342 is continuously connected with the sun gear member 1352 through the interconnecting member 1378.

The planet carrier assembly member 1326 is selectively connectable with the transmission housing 1380 through the braking synchronizer 1364. The ring gear member 1324 is selectively connectable with the transmission housing 1380 through the braking synchronizer 1365.

The planet carrier assembly member 1326 is selectively connectable with the input shaft 17 through the input clutch 1362 and the rotating synchronizer 1366. The planet carrier assembly member 1336 is selectively connectable with the input shaft 17 through the input clutch 1362 and the rotating synchronizer 1367. The ring gear member 1324 is selectively connectable with the planet carrier assembly member 1336 through the rotating synchronizer 1368. The ring gear member 1354 is selectively connectable with the transmission housing 1380 through the braking synchronizer 1369. The planet carrier assembly member 1346 is selectively connectable with the ring gear member 1354 through the rotating synchronizer 1371. The planet carrier assembly member 1346 is selectively connectable with the planet carrier assembly member 1356 through the rotating synchronizer 1372.

The truth table shown in FIG. 14b describes the engagement combination and engagement sequence necessary to provide the reverse drive ratio and five forward speed ratios. A sample of the numerical values for the ratios is also provided in the truth table of FIG. 14b. These values are determined utilizing the ring gear/sun gear tooth ratios also given in FIG. 14b. The R1/S1 value is the tooth ratio for the planetary gear set 1320; the R2/S2 value is the tooth ratio for the planetary gear set 1330; the R3/S3 value is the tooth ratio for the planetary gear set 1340; and the R4/S4 value is the tooth ratio for the planetary gear set 1350. Also given in FIG. 14b is a chart describing the step ratios between the adjacent forward speed ratios and the reverse to first forward speed ratio. For example, the first to second forward speed ratio step is 1.90.

Those skilled in the art will recognize that the numerical values of the reverse, first and fifth forward speed ratios are determined utilizing the ring gear/sun gear tooth ratios of the planetary gear sets 1320, 1330. The numerical value of the second forward speed ratio is determined utilizing the ring gear/sun gear tooth ratios of the planetary gear sets 1340, 1350. The numerical value of the third forward speed ratio is determined utilizing the ring gear/sun gear tooth ratio of the planetary gear set 1330. The numerical value of the fourth forward speed ratio is 1.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:
an input shaft;
an output shaft;
first, second, third and fourth planetary gear sets each having first, second and third members;
a first interconnecting member continuously interconnecting said first member of said first planetary gear set with said first member of said second planetary gear set;
a second interconnecting member continuously interconnecting a member of said first or second planetary gear set with said first member of said third planetary gear set and said output shaft;
a third interconnecting member continuously interconnecting said second member of said third planetary gear set with said first member of said fourth planetary gear set;
a first input clutch continuously connected with said input shaft;
a second input clutch selectively interconnecting said input shaft with said third member of said third planetary gear set;
first and second torque-transmitting mechanisms selectively interconnecting members of said first and second planetary gear sets with said first input clutch;
a third torque-transmitting mechanisms selectively interconnecting a member of said first or second planetary gear set with another member of said first or second planetary gear set or with said first input clutch;
fourth and fifth torque-transmitting mechanisms selectively interconnecting members of said third planetary gear set with members of said fourth planetary gear set;
sixth and seventh torque-transmitting mechanisms selectively interconnecting members of said first or second planetary gear set with a stationary member;
eighth and ninth torque-transmitting mechanisms selectively interconnecting members of said fourth planetary gear set with said stationary member; and
said input clutches and torque-transmitting mechanisms being engaged in combinations of at least three to provide at least six forward speed ratios and a reverse speed ratio.

2. The transmission defined in claim 1, wherein said nine torque-transmitting mechanisms comprise synchronizers.

3. The transmission defined in claim 1, wherein said first, second, third, fourth and fifth torque-transmitting mechanisms comprise rotating synchronizers, and said sixth, seventh, eighth and ninth torque-transmitting mechanisms comprise braking synchronizers.

4. The transmission defined in claim 1, wherein said first input clutch is applied for odd number speed ranges and said second input clutch is applied for even number speed ranges.

5. The transmission defined in claim 1, wherein said first input clutch is applied for even number speed ranges and said second input clutch is applied for odd number speed ranges.

6. The transmission defined in claim 1, wherein said first input clutch and said second input clutch are interchangeable to shift from odd number speed ranges to even number speed ranges, and vice versa.

7. The transmission defined in claim 1, wherein selected ones of said nine torque-transmitting mechanisms are engaged prior to gear shifting to achieve shifting without torque interruptions.

8. The transmission defined in claim 1, wherein at least two of said synchronizers comprise a double synchronizer to reduce cost and package size.

9. A multi-speed transmission comprising:
an input shaft;
an output shaft;
first, second, third and fourth planetary gear sets each having first, second and third members;
a first interconnecting member continuously interconnecting said first member of said first planetary gear set with said first member of said second planetary gear set;
a second interconnecting member continuously interconnecting a member of said first or second planetary gear set with said first member of said third planetary gear set and said output shaft;
a third interconnecting member continuously interconnecting said second member of said third planetary gear set with said first member of said fourth planetary gear set;
a first input clutch continuously connected with said input shaft;
a second input clutch selectively interconnecting said input shaft with said third member of said third planetary gear set; and
nine torque-transmitting mechanisms for selectively interconnecting said members of said first, second, third or fourth planetary gear sets with said first or second input clutch, said output shaft, said first, second or third interconnecting member, a stationary member or with other members of said planetary gear sets, said input clutches and nine torque-transmitting mechanisms being engaged in combinations of at least three to establish at least six forward speed ratios and a reverse speed ratio between said input shaft and said output shaft.

10. The transmission defined in claim 9, wherein a first and second of said nine torque-transmitting mechanisms are selectively operable for interconnecting members of said first and second planetary gear sets with said first input clutch.

11. The transmission defined in claim 9, wherein a third of said nine torque-transmitting mechanisms is selectively operable for interconnecting a member of said first or second planetary gear set with another member of said first or second planetary gear set or with said first input clutch.

12. The transmission defined in claim 9, wherein a fourth and fifth of said nine torque-transmitting mechanisms are selectively operable for interconnecting members of said third planetary gear set with members of said fourth planetary gear set.

13. The transmission defined in claim 9, wherein a sixth and seventh of said nine torque-transmitting mechanisms are operable for selectively interconnecting members of said first or second planetary gear set with said stationary member.

14. The transmission defined in claim 9, wherein eighth and ninth of said nine torque-transmitting mechanisms are operable for selectively interconnecting members of said fourth planetary gear set with said stationary member.

15. The transmission defined in claim 9, wherein planet carrier assembly members of a plurality of said planetary gear sets are of the single pinion type.

16. The transmission defined in claim 9, wherein planet carrier assembly members of a plurality of said planetary gear sets are of the double pinion type.

17. The transmission defined in claim 9, wherein each of said nine torque-transmitting mechanisms comprises a synchronizer.

18. The transmission defined in claim 9, wherein said first input clutch is applied for odd number speed ranges and said second input clutch is applied for even number speed ranges.

19. The transmission defined in claim 9, wherein said first input clutch is applied for even number speed ranges and said second input clutch is applied for odd number speed ranges.

20. The transmission defined in claim 9, wherein selected ones of said nine torque-transmitting mechanisms are engaged prior to gear shifting to achieve shifting without torque interruptions.

21. A multi-speed transmission comprising:
an input shaft;
an output shaft;
first, second, third and fourth planetary gear sets each having first, second and third members;
a first interconnecting member continuously interconnecting said first member of said first planetary gear set with said first member of said second planetary gear set;
a second interconnecting member continuously interconnecting a member of said first or second planetary gear set with said first member of said third planetary gear set and said output shaft;
a third interconnecting member continuously interconnecting said second member of said third planetary gear set with said first member of said fourth planetary gear set;
first and second torque-transmitting mechanisms selectively interconnecting members of said first and second planetary gear set with said input shaft and, therefore, functioning as a first input clutch;
a second input clutch selectively interconnecting said input shaft with said third member of said third planetary gear set;
a third torque-transmitting mechanisms selectively interconnecting a member of said first or second planetary gear set with another member of said first or second planetary gear set;
fourth and fifth torque-transmitting mechanisms selectively interconnecting members of said third planetary gear set with members of said fourth planetary gear set;
sixth and seventh torque-transmitting mechanisms selectively interconnecting members of said first or second planetary gear set with a stationary member;

eighth and ninth torque-transmitting mechanisms selectively interconnecting members of said fourth planetary gear set with said stationary member; and said input clutches and torque-transmitting mechanisms being engaged in combinations of at least three to provide at least six forward speed ratios and a reverse speed ratio.

22. The transmission defined in claim 21, wherein said nine torque-transmitting mechanisms comprise synchronizers.

23. The transmission defined in claim 21, wherein said first input clutch is applied for odd number speed ranges and said second input clutch is applied for even number speed ranges.

24. The transmission defined in claim 21, wherein said first input clutch is applied for even number speed ranges and said second input clutch is applied for odd number speed ranges.

25. The transmission defined in claim 21, wherein said first input clutch and said second input clutch are interchangeable to shift from odd number speed ranges to even number speed ranges, and vice versa.

26. The transmission defined in claim 21, wherein selected ones of said nine torque-transmitting mechanisms are engaged prior to gear shifting to achieve shifting without torque interruptions.

27. The transmission defined in claim 21, wherein at least two of said synchronizers comprise a double synchronizer to reduce cost and package size.

28. A multi-speed transmission comprising:

an input shaft;

an output shaft;

first, second, third and fourth planetary gear sets each having first, second and third members;

a first interconnecting member continuously interconnecting said first member of said first planetary gear set with said first member of said second planetary gear set;

a second interconnecting member continuously interconnecting a member of said first or second planetary gear set with said first member of said third planetary gear set and said output shaft;

a third interconnecting member continuously interconnecting said second member of said third planetary gear set with said first member of said fourth planetary gear set;

a first input clutch selectively engageable between said input shaft and members of said first and second planetary gear set;

a second input clutch selectively interconnecting said input shaft with said third member of said third planetary gear set; and eight torque-transmitting mechanisms for selectively interconnecting said members of said first, second, third or fourth planetary gear sets with said first or second input clutch, said output shaft, said first, second or third interconnecting member, a stationary member or with other members of said planetary gear sets, said input clutches and eight torque-transmitting mechanisms being engaged in combinations of at least three to establish at least five forward speed ratios and a reverse speed ratio between said input shaft and said output shaft.

29. The transmission defined in claim 28, wherein a first and second of said eight torque-transmitting mechanisms are selectively operable for interconnecting members of said first or second planetary gear set with said first input clutch.

30. The transmission defined in claim 28, wherein a third of said eight torque-transmitting mechanisms is selectively operable for interconnecting a member of said first or second planetary gear set with another member of said first or second planetary gear set or with said first input clutch.

31. The transmission defined in claim 28, wherein a fourth and fifth of said eight torque-transmitting mechanisms are selectively operable for interconnecting members of said third planetary gear set with members of said fourth planetary gear set.

32. The transmission defined in claim 28, wherein a sixth and seventh of said eight torque-transmitting mechanisms are operable for selectively interconnecting members of said first or second planetary gear set with said stationary member.

33. The transmission defined in claim 28, wherein an eighth of said eight torque-transmitting mechanisms is operable for selectively interconnecting a member of said fourth planetary gear set with said stationary member.

34. The transmission defined in claim 28, wherein planet carrier assembly members of a plurality of said planetary gear sets are of the single pinion type.

35. The transmission defined in claim 28, wherein planet carrier assembly members of a plurality of said planetary gear sets are of the double pinion type.

36. The transmission defined in claim 28, wherein each of said eight torque-transmitting mechanisms comprises a synchronizer.

37. The transmission defined in claim 28, wherein said first input clutch is applied for odd number speed ranges and said second input clutch is applied for even number speed ranges.

38. The transmission defined in claim 28, wherein said first input clutch is applied for even number speed ranges and said second input clutch is applied for odd number speed ranges.

39. The transmission defined in claim 28, wherein selected ones of said eight torque-transmitting mechanisms are engaged prior to gear shifting to achieve shifting without torque interruptions.

* * * * *